US012795105B2

(12) United States Patent
Chen et al.

(10) Patent No.: US 12,795,105 B2
(45) Date of Patent: Nov. 10, 2026

(54) DECODING AND ENCODING METHOD AND APPARATUS, AND DEVICE

(71) Applicant: HANGZHOU HIKVISION DIGITAL TECHNOLOGY CO., LTD., Hangzhou (CN)

(72) Inventors: Fangdong Chen, Hangzhou (CN); Xiaoyang Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/146,810

(22) PCT Filed: Jan. 10, 2024

(86) PCT No.: PCT/CN2024/071485

§ 371 (c)(1),
(2) Date: Jul. 9, 2025

(87) PCT Pub. No.: WO2024/149272

PCT Pub. Date: Jul. 18, 2024

(65) Prior Publication Data

US 2026/0222577 A1 Jul. 30, 2026

(30) Foreign Application Priority Data

Jan. 10, 2023 (CN) ......................... 202310036511.8

(51) Int. Cl.
*H04N 19/00* (2014.01)
*H04N 19/132* (2014.01)
(Continued)

(52) U.S. Cl.
CPC ......... *H04N 19/136* (2014.11); *H04N 19/132* (2014.11); *H04N 19/176* (2014.11);
(Continued)

(58) Field of Classification Search
CPC .. H04N 19/136; H04N 19/132; H04N 19/176; H04N 19/189; H04N 19/70; H04N 19/85
See application file for complete search history.

(56) References Cited

U.S. PATENT DOCUMENTS

2018/0176570 A1 6/2018 Rippel et al.
2022/0286696 A1 9/2022 Gao et al.

FOREIGN PATENT DOCUMENTS

CA 3222179 A1 12/2022
CN 111641832 A 9/2020
(Continued)

OTHER PUBLICATIONS

International Search Report in International Appln. No. PCT/CN2024/071485, mailed on Apr. 24, 2024, 4 pages (with English translation).
(Continued)

*Primary Examiner* — Frank F Huang
(74) *Attorney, Agent, or Firm* — Fish & Richardson P.C.

(57) ABSTRACT

The present disclosure provides a decoding and encoding method and apparatus, and a device. The decoding method comprises: obtaining a first feature corresponding to a current image block by means of a first neural network, and obtaining a feature adjusting factor corresponding to the current image block, wherein the first neural network comprises at least one convolutional layer; determining a target feature on the basis of the first feature and the feature adjusting factor; and based on the target feature, obtaining a reconstructed image block corresponding to the current image block by means of a second neural network, wherein the second neural network comprises at least one convolutional layer. By means of the technical solution of the present disclosure, encoding and decoding performance can be improved.

20 Claims, 12 Drawing Sheets

(51) Int. Cl.

| | |
|---|---|
| ***H04N 19/136*** | (2014.01) |
| ***H04N 19/176*** | (2014.01) |
| ***H04N 19/189*** | (2014.01) |
| ***H04N 19/70*** | (2014.01) |
| ***H04N 19/85*** | (2014.01) |

(52) U.S. Cl.

CPC .......... *H04N 19/189* (2014.11); *H04N 19/70* (2014.11); *H04N 19/85* (2014.11)

(56) References Cited

FOREIGN PATENT DOCUMENTS

| | | | |
|---|---|---|---|
| CN | 111800629 | A | 10/2020 |
| CN | 114025164 | A | 2/2022 |
| CN | 114339262 | A | 4/2022 |
| CN | 114390296 | A | 4/2022 |
| CN | 115512199 | A | 12/2022 |
| EP | 3633990 | A1 | 4/2020 |
| EP | 3952306 | A1 | 2/2022 |
| WO | WO 2022084702 | A1 | 4/2022 |

OTHER PUBLICATIONS

Pan et al., "Content Adaptive Latents and Decoder for Neural Image Compression," Springer Nature, Dec. 3, 2022, 19 pages.

Office Action in Chinese Appln. No. 2024119210560, mailed on Dec. 18, 2025, 15 pages (with English translation).

Choi et al., "Scalable Image Coding for Humans and Machines," IEEE Transactions on Image Processing, Mar. 2022, 31:2739-2754, 16 pages.

Koki et al., "Universal Deep Image Compression via Content-Adaptive Optimization with Adapters," presented at the IEEE/CVF Winter Conference on Applications of Computer Vision (WACV), Jan. 3-7, 2023, Waikoloa, Hawaii, 10 pages.

Office Action in Japanese Appln. No. 2025-540492, mailed May 12, 2026, 8 pages (with English translation).

DECODING AND ENCODING METHOD AND APPARATUS, AND DEVICE

CROSS REFERENCE TO RELATED APPLICATIONS

This application is a US National Phase of a PCT Application No. PCT/CN2024/071485 filed on Jan. 10, 2024, which claims priority to Chinese Patent Application No. 202310036511.8 filed on Jan. 10, 2023, the entire contents of which are incorporated herein by reference in their entireties.

TECHNICAL FIELD

The present disclosure relates to the field of encoding and decoding technology, particularly to decoding and encoding methods and apparatuses, and devices thereof.

BACKGROUND

To save space, video pictures are encoded before transmission, and complete video encoding can include processes such as prediction, transformation, quantization, entropy encoding, filtering, etc. The prediction process can include intra prediction and inter prediction. Inter prediction utilizes a temporal correlation of a video to predict pixels of a current picture by pixels of an adjacent encoded picture, to remove temporal redundancy in the video. Intra prediction utilizes a spatial correlation of a video to predict a current pixel using pixels of encoded blocks in a current frame picture, to remove spatial redundancy in the video.

With the rapid development of deep learning, deep learning has achieved success in many high-level computer vision problems, such as picture classification, object detection, etc. Deep learning is also gradually being applied in the field of encoding and decoding, that is, a neural network can be used to encode and decode pictures. Although encoding and decoding methods based on neural networks have shown great performance potential, the encoding and decoding methods based on neural networks still suffer from issues such as poor encoding performance, poor decoding performance, and high complexity.

SUMMARY

In view of this, the present disclosure provides decoding and encoding methods and apparatuses, and devices thereof to improve encoding and decoding performance.

In the first aspect, the present disclosure provides a method for image decoding, comprising: obtaining a first feature corresponding to a current picture block by a first neural network, and obtaining a feature adjustment factor corresponding to the current picture block, enhancing the first feature to obtain a second feature; performing feature adjustment on the second feature based on the feature adjustment factor, to obtain a third feature; determining a target feature based on the third feature; and obtaining a reconstructed picture block corresponding to the current picture block by a second neural network based on the target feature.

In some embodiments, enhancing the first feature to obtain the second feature includes: determining an initial feature corresponding to an attention subnetwork based on the first feature; performing feature enhancement on the initial feature by a residual enhancement network, to obtain an enhanced feature; generating a weight feature corresponding to the initial feature by a weight generation subnetwork; and generating the second feature based on the enhanced feature and the weight feature.

In some embodiments, determining the target feature based on the third feature includes: determining an initial feature corresponding to an attention subnetwork based on the first feature; generating a fourth feature based on the initial feature and the third feature; and determining the target feature based on the fourth feature.

In some embodiments, determining the initial feature corresponding to the attention subnetwork based on the first feature comprises: performing feature enhancement on the first feature by an initial enhancement network, to obtain an enhanced feature; and performing upsampling convolution on the enhanced feature by an upsampling convolutional subnetwork, to obtain the initial feature corresponding to the attention subnetwork.

In some embodiments, the weight generation subnetwork comprises a residual block subnetwork, a convolutional subnetwork, and a feature mapping subnetwork, and generating the weight feature corresponding to the initial feature by the weight generation subnetwork comprises, convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

In some embodiments, performing the feature adjustment on the second feature based on the feature adjustment factor to obtain the third feature comprises:

- when the second feature includes C*H*W feature values, wherein the C represents a number of channels, the H represents a feature height, and the W represents a feature width, determining feature adjustment values corresponding to the C*H*W feature values based on the feature adjustment factor, and performing feature adjustment on the C*H*W feature values based on the feature adjustment values to obtain adjusted feature values corresponding to the C*H*W feature values; and
- generating the third feature based on the adjusted feature values corresponding to the C*H*W feature values.

In some embodiments, determining the feature adjustment values corresponding to the C*H*W feature values based on the feature adjustment factor comprises:

- when the feature adjustment factor includes C*H*W feature adjustment values, determining the feature adjustment values respectively corresponding to the C*H*W feature values based on the C*H*W feature adjustment values; or
- when the feature adjustment factor includes H*W feature adjustment values, determining the feature adjustment values respectively corresponding to the C*H*W feature values based on the H*W feature adjustment values; or
- when the feature adjustment factor includes C feature adjustment values, determining the feature adjustment values respectively corresponding to the C*H*W feature values based on the C feature adjustment values.

In some embodiments, the method further includes:

- when a feature adjustment mode is enabled for the current picture block, obtaining the feature adjustment factor corresponding to the current picture block; wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

In some embodiments, the first neural network comprises a decoding subnetwork.

In some embodiments, the first neural network comprises a decoding subnetwork, and obtaining the first feature corresponding to the current picture block by the first neural network comprises:

obtaining a probability distribution parameter based on a bitstream corresponding to the current picture block; determining a probability distribution model based on the probability distribution parameter, and decoding a bitstream corresponding to the current picture block based on the probability distribution model to obtain a decoded picture feature; and determining the first feature corresponding to the current picture block based on the decoded picture feature; or obtaining a probability distribution parameter and a predicted value based on a bitstream corresponding to the current picture block; and determining a probability distribution model based on the probability distribution parameter, and decoding a bitstream corresponding to the current picture block based on the probability distribution model to obtain a decoded picture feature; and performing residual recovery on the decoded picture feature to obtain a residual feature; and determine the first feature corresponding to the current picture block based on the residual feature and the predicted value.

In some embodiments, obtaining the first feature corresponding to the current picture block by the first neural network comprises:

obtaining the probability distribution parameter based on a bitstream corresponding to the current picture block; determining the probability distribution model based on the probability distribution parameter, and decoding a bitstream corresponding to the current picture block based on the probability distribution model to obtain the decoded picture feature, and determining the first feature corresponding to the current picture block based on the decoded picture feature; and the method further comprises: performing synthesis transformation on the first feature by a synthetic transformation network to obtain a reconstructed picture block corresponding to the current picture block; wherein during the synthesis transformation, the first feature is enhanced to obtain the second feature; the feature adjustment is performed on the second feature based on the feature adjustment factor, to obtain the third feature; the target feature is determined based on the third feature; and the reconstructed picture block corresponding to the current picture block is determined based on the target feature.

In some embodiments, the method further comprises: obtaining a predicted value based on a bitstream corresponding to the current picture block; and determining the first feature corresponding to the current picture block based on the decoded picture feature comprises: performing residual recovery on the decoded picture feature to obtain a residual feature; and determining the first feature corresponding to the current picture block based on the residual feature and the predicted value.

In some embodiments, obtaining the feature adjustment factor corresponding to the current picture block comprises: decoding a bitstream corresponding to the current picture block to obtain the feature adjustment factor corresponding to the current picture block; or determining a fixed parameter value as the feature adjustment factor corresponding to the current picture block.

In some embodiments, the second neural network comprises a reconstruction decoding subnetwork, and obtaining the reconstructed picture block corresponding to the current picture block by the second neural network based on the target feature comprises: processing the target feature by reconstruction decoding subnetwork, to obtain the reconstructed picture block; wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork to obtain a upsampled convoluted feature, and performing color space transformation on the upsampled convoluted feature by the color space transformation subnetwork to obtain the reconstructed picture block.

Correspondingly, the present disclosure provides a method for image encoding, comprising: obtaining a first feature corresponding to the current picture block by a first neural network; obtaining a feature adjustment factor corresponding to the current picture block based on the first feature, and encoding the feature adjustment factor in a stream corresponding to the current picture block; enhancing the first feature to obtain a second feature; performing feature adjustment on the second feature based on the feature adjustment factor, to obtain a third feature; determining a target feature based on the third feature; and obtaining a reconstructed picture block corresponding to the current picture block by a second neural network based on the target feature.

In the second aspect, the present disclosure provides a method for image decoding, comprising: obtaining a first feature corresponding to a current picture block by a first neural network, and obtaining a feature adjustment factor corresponding to the current picture block; determining an initial feature corresponding to an attention subnetwork based on the first feature; enhancing the initial feature by a residual enhancement subnetwork to obtain an enhanced feature; generating a weight feature corresponding to the initial feature by a weight generation subnetwork; and generating a second feature based on the enhanced feature and the weight feature; performing feature adjustment on the second feature based on the feature adjustment factor, to obtain a third feature; determining a target feature based on the third feature; and obtaining a reconstructed picture block corresponding to the current picture block by a second neural network based on the target feature.

In some embodiments, determining the initial feature corresponding to the attention subnetwork based on the first feature comprises: performing feature enhancement on the first feature by an initial enhancement network, to obtain an enhanced feature; and performing upsampling convolution on the enhanced feature by an upsampling convolutional subnetwork, to obtain the initial feature corresponding to the attention subnetwork.

In some embodiments, the weight generation subnetwork comprises a residual block subnetwork, a convolutional subnetwork, and a feature mapping subnetwork, and generating the weight feature corresponding to the initial feature by the weight generation subnetwork comprises: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

In some embodiments, the first neural network comprises a decoding subnetwork, and obtaining the first feature corresponding to the current picture block by the first neural network comprises:

obtaining the probability distribution parameter based on a bitstream corresponding to the current picture block; determining the probability distribution model based on the probability distribution parameter, and decoding a bitstream corresponding to the current picture block based on the probability distribution model to obtain the decoded picture feature; and determining the first feature corresponding to the current picture block based on the decoded picture feature; or obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature, and determining the first feature corresponding to the current picture block based on the residual feature and the predicted value.

In some embodiments, obtaining the feature adjustment factor corresponding to the current picture block comprises: decoding a bitstream corresponding to the current picture block to obtain the feature adjustment factor corresponding to the current picture block; or determining a fixed parameter value as the feature adjustment factor corresponding to the current picture block.

In some embodiments, the second neural network comprises a reconstruction decoding subnetwork, and obtaining the reconstructed picture block corresponding to the current picture block by the second neural network based on the target feature comprises:

processing the target feature by reconstruction decoding subnetwork, to obtain the reconstructed picture block;

wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork, and performing color space transformation on a upsampled convoluted feature by the color space transformation subnetwork to obtain the reconstructed picture block.

In some embodiments, the method further includes: when a feature adjustment mode is enabled for the current picture block, obtaining the feature adjustment factor corresponding to the current picture block; wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

Correspondingly, the present disclosure provides a method for image encoding, comprising: obtaining a first feature corresponding to a current picture block by a first neural network; obtaining a feature adjustment factor corresponding to the current picture block based on the first feature; and encoding the feature adjustment factor in a stream corresponding to the current picture block; determining an initial feature corresponding to an attention subnetwork based on the first feature; enhancing the initial feature by a residual enhancement subnetwork to obtain an enhanced feature; generating a weight feature corresponding to the initial feature by a weight generation subnetwork; and generating a second feature based on the enhanced feature and the weight feature; performing feature adjustment on the second feature based on the feature adjustment factor, to obtain a third feature; determining a target feature based on the third feature; and obtaining a reconstructed picture block corresponding to the current picture block by a second neural network based on the target feature.

In the third aspect, the present disclosure provides a method for image decoding, comprising:

obtaining a first feature corresponding to a current picture block by a first neural network, and obtaining a feature adjustment factor corresponding to the current picture block;

enhancing the first feature to obtain a second feature;

performing feature adjustment on the second feature based on the feature adjustment factor, to obtain a third feature; where when the second feature includes C*H*W feature values, where C represents the number of channels, H represents a feature height, and W represents a feature width, the feature adjustment values corresponding to the C*H*W feature values are determined based on the feature adjustment factor, and the C*H*W feature values are adjusted based on the feature adjustment values to obtain the adjusted feature values corresponding to the C*H*W feature values, and the third feature is generated based on the adjusted feature values corresponding to the C*H*W feature values, determining a target feature based on the third feature; and obtaining a reconstructed picture block corresponding to the current picture block by a second neural network based on the target feature.

In some embodiments, determining the feature adjustment values corresponding to the C*H*W feature values based on the feature adjustment factor comprises:

when the the feature adjustment factor includes C*H*W feature adjustment values, determining the feature adjustment values respectively corresponding to the C*H*W feature values based on the C*H*W feature adjustment values; or when the the feature adjustment factor includes H*W feature adjustment values, determining the feature adjustment values respectively corresponding to the C*H*W feature values based on the H*W feature adjustment values; or when the the feature adjustment factor includes C feature adjustment values, determining the feature adjustment values respectively corresponding to the C*H*W feature values based on the C feature adjustment values.

In some embodiments, the first neural network comprises a decoding subnetwork, and obtaining the first feature corresponding to the current picture block by the first neural network comprises:

obtaining the probability distribution parameter based on a bitstream corresponding to the current picture block; determining the probability distribution model based on the probability distribution parameter, and decoding a bitstream corresponding to the current picture block based on the probability distribution model to obtain the decoded picture feature; and determining the first feature corresponding to the current picture block based on the decoded picture feature; or obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature; and determining the first feature corresponding to the current picture block based on the residual feature and the predicted value.

In some embodiments, obtaining the feature adjustment factor corresponding to the current picture block comprises: decoding a bitstream corresponding to the current picture block to obtain the feature adjustment factor corresponding to the current picture block; or determining a fixed parameter value as the feature adjustment factor corresponding to the current picture block.

In some embodiments, the second neural network comprises a reconstruction decoding subnetwork, and obtaining the reconstructed picture block corresponding to the current picture block by the second neural network based on the target feature comprises:

processing the target feature by reconstruction decoding subnetwork, to obtain the reconstructed picture block;

wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork, and performing color space transformation on a upsampled convoluted feature by the color space transformation subnetwork to obtain the reconstructed picture block.

In some embodiments, the method further includes: when a feature adjustment mode is enabled for the current picture block, obtaining the feature adjustment factor corresponding to the current picture block; wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

Correspondingly, the present disclosure provides a method for image encoding, comprising:

obtaining a first feature corresponding to a current picture block by a first neural network; obtaining a feature adjustment factor corresponding to the current picture block based on the first feature; and encoding the feature adjustment factor in a stream corresponding to the current picture block;

enhancing the first feature to obtain a second feature;

performing feature adjustment on the second feature based on the feature adjustment factor, to obtain a third feature; where when the second feature includes C*H*W feature values, where C represents the number of channels, H represents a feature height, and W represents a feature width, the feature adjustment values corresponding to the C*H*W feature values are determined based on the feature adjustment factor, and the C*H*W feature values are adjusted based on the feature adjustment values to obtain the adjusted feature values corresponding to the C*H*W feature values, and the third feature is generated based on the adjusted feature values corresponding to the C*H*W feature values;

determining a target feature based on the third feature; and obtaining a reconstructed picture block corresponding to the current picture block by a second neural network based on the target feature.

In the fourth aspect, the present disclosure provides a method for image decoding, comprising: obtaining a first feature corresponding to a current picture block by a first neural network, and obtaining a feature adjustment factor corresponding to the current picture block; enhancing the first feature to obtain a second feature; performing feature adjustment on the second feature based on the feature adjustment factor, to obtain a third feature; determining an initial feature corresponding to an attention subnetwork based on the first feature; generating a fourth feature based on the initial feature and the third feature; and determining the target feature based on the fourth feature, obtaining a reconstructed picture block corresponding to the current picture block by a second neural network based on the target feature.

In some embodiments, determining the initial feature corresponding to the attention subnetwork based on the first feature comprises: performing feature enhancement on the first feature by an initial enhancement network, to obtain an enhanced feature; and performing upsampling convolution on the enhanced feature by an upsampling convolutional subnetwork, to obtain the initial feature corresponding to the attention subnetwork.

In some embodiments, the first neural network comprises a decoding subnetwork, and obtaining the first feature corresponding to the current picture block by the first neural network comprises:

obtaining the probability distribution parameter based on a bitstream corresponding to the current picture block; determining the probability distribution model based on the probability distribution parameter, and decoding a bitstream corresponding to the current picture block based on the probability distribution model to obtain the decoded picture feature; and determining the first feature corresponding to the current picture block based on the decoded picture feature; or obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature, and determining the first feature corresponding to the current picture block based on the residual feature and the predicted value.

In some embodiments, obtaining the feature adjustment factor corresponding to the current picture block comprises: decoding a bitstream corresponding to the current picture block to obtain the feature adjustment factor corresponding to the current picture block; or determining a fixed parameter value as the feature adjustment factor corresponding to the current picture block.

In some embodiments, the second neural network comprises a reconstruction decoding subnetwork, and obtaining the reconstructed picture block corresponding to the current picture block by the second neural network based on the target feature comprises:

processing the target feature by reconstruction decoding subnetwork, to obtain the reconstructed picture block;

wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork, and performing color space transformation on a upsampled convoluted feature by the color space transformation subnetwork to obtain the reconstructed picture block.

In some embodiments, the method further includes: when a feature adjustment mode is enabled for the current picture block, obtaining the feature adjustment factor corresponding to the current picture block; wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

Correspondingly, the present disclosure provides a method for image encoding, comprising: obtaining a first feature corresponding to a current picture block by a first neural network; obtaining a feature adjustment factor corresponding to the current picture block based on the first feature; and encoding the feature adjustment factor in a stream corresponding to the current picture block; enhancing the first feature to obtain a second feature; performing feature adjustment on the second feature based on the feature adjustment factor, to obtain a third feature; determining an initial feature corresponding to an attention subnetwork based on the first feature; generating a fourth feature based on the initial feature and the third feature, and determining the target feature based on the fourth feature, obtaining a reconstructed picture block corresponding to the current picture block by a second neural network based on the target feature.

In the fifth aspect, the present disclosure provides a method for image decoding, comprising:

obtaining the probability distribution parameter based on a bitstream corresponding to a current picture block; determining the probability distribution model based on the probability distribution parameter, and decoding a bitstream corresponding to the current picture block based on the probability distribution model to obtain the decoded picture feature; and determining the first feature corresponding to the current picture block based on the decoded picture feature;

obtaining a feature adjustment factor corresponding to the current picture block;

performing synthesis transformation on the first feature by a synthetic transformation network to obtain a reconstructed picture block corresponding to the current picture block; wherein during the synthesis transformation, the first feature is enhanced to obtain the second feature; the feature adjustment is performed on the second feature based on the feature adjustment factor, to obtain the third feature; the target feature is determined based on the third feature; and the reconstructed picture block corresponding to the current picture block is determined based on the target feature.

In some embodiments, the method further comprises: obtaining a predicted value based on a bitstream corresponding to the current picture block; and determining the first feature corresponding to the current picture block based on the decoded picture feature comprises: performing residual recovery on the decoded picture feature to obtain a residual feature; and determine the first feature corresponding to the current picture block based on the residual feature and the predicted value.

In some embodiments, obtaining the feature adjustment factor corresponding to the current picture block comprises: decoding a bitstream corresponding to the current picture block to obtain the feature adjustment factor corresponding to the current picture block; or determining a fixed parameter value as the feature adjustment factor corresponding to the current picture block.

In some embodiments, obtaining the reconstructed picture block corresponding to the current picture block based on the target feature comprises:

processing the target feature by reconstruction decoding subnetwork, to obtain the reconstructed picture block;

wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork, and performing color space transformation on a upsampled convoluted feature by the color space transformation subnetwork to obtain the reconstructed picture block.

In some embodiments, the method further includes: when a feature adjustment mode is enabled for the current picture block, obtaining the feature adjustment factor corresponding to the current picture block; wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

Correspondingly, the present disclosure provides a method for image encoding, comprising:

obtaining the probability distribution parameter based on a bitstream corresponding to a current picture block, determining the probability distribution model based on the probability distribution parameter, and decoding a bitstream corresponding to the current picture block based on the probability distribution model to obtain the decoded picture feature; and determining the first feature corresponding to the current picture block based on the decoded picture feature;

obtaining a feature adjustment factor corresponding to the current picture block based on the first feature; and encoding the feature adjustment factor in a stream corresponding to the current picture block;

performing synthesis transformation on the first feature by a synthetic transformation network to obtain a reconstructed picture block corresponding to the current picture block; wherein during the synthesis transformation, the first feature is enhanced to obtain the second feature; the feature adjustment is performed on the second feature based on the feature adjustment factor, to obtain the third feature; the target feature is determined based on the third feature; and the reconstructed picture block corresponding to the current picture block is determined based on the target feature.

The present disclosure provides a decoding device applied to a decoding end, including:

one or more memories configured to store video data; and a decoder configured to implement any one of the above methods for image decoding.

The present disclosure provides an encoding device applied to the encoding end, including:

one or more memories configured to store video data; and an encoder configured to implement any one of the above methods for image decoding.

The present disclosure provides a decoding end device, including: one or more processors and one or more machine-readable storage media, where the one or more machine-readable storage media store machine executable instructions that can be executed by the one or more processors; and the one or more processors are configured to execute the machine executable instructions to implement any one of the above methods for image decoding.

The present disclosure provides an encoding end device, including: one or more processors and one or more machine-readable storage media, where the one or more machine-readable storage media store machine executable instructions that can be executed by the one or more processors; and the one or more processors are configured to execute machine executable instructions to implement any one of the above methods for image encoding.

The present disclosure provides an electronic device including one or more processors and one or more machine-readable storage media, where the one or more machine-readable storage media store a machine executable instruction that can be executed by the one or more processors; and the one or more processors are configured to execute the machine executable instruction to implement any one of the above methods for image decoding, or any one of the above methods for image encoding.

The present disclosure provides a machine-readable storage medium, which stores several computer instructions. When the computer instructions are executed by a processor, any one of the above methods for image decoding or any one of the above methods for image encoding is implemented.

As can be seen from the above technical solutions, in the embodiments of the present disclosure, the first feature corresponding to the current picture block is obtained by the neural network, and the first feature is adjusted based on the feature adjustment factor corresponding to the current picture block to obtain the target feature. Based on the target feature, the reconstructed picture block corresponding to the current picture block is obtained by the neural network. Thus, an end-to-end video picture compression method is proposed, which can encode or decode video pictures based on neural networks and improve encoding or decoding efficiency by combining the feature adjustment factor. Combining the network architecture design and the auxiliary bitstream allows the neural network to effectively ensure the quality of reconstructed picture blocks while maintaining low complexity, which achieves the goal of improving encoding and decoding performance and reducing complexity.

DETAILED DESCRIPTION

Figure 1:
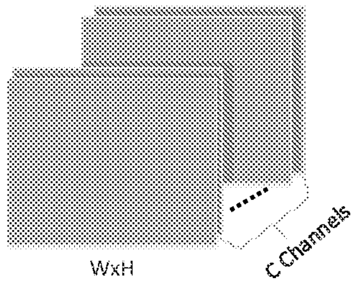
FIG. 1 is a schematic diagram of a three-dimensional feature matrix according to an embodiment of the present disclosure.

The terms used in the embodiments of the present disclosure are only for the purpose of describing specific embodiments and are not intended to limit the present disclosure. As used in the present disclosure and claims, the singular forms “a,” “said,” and “the” are intended to include the plural forms as well, unless the context clearly indicates otherwise. It should also be understood that the term “and/or” as used herein refers to and includes any and all possible combinations of one or more of the associated listed items. It shall be understood that, although the terms “first,” “second,” “third,” and the like can be used herein to describe various information, the information should not be limited by these terms. These terms are only used to distinguish the same type of information from each other. For example, without departing from the scope of the present disclosure, first information can be referred as second information, and similarly, second information can also be referred as first information, according to the context. The word “if” as used herein can be interpreted as “at the time of,” “when,” or “in response to determining that”.

The embodiments of the present disclosure propose decoding and encoding methods, which may involve the following concepts.

JPEG (Joint Photographic Experts Group); JPEG is a standard for compressing continuous tone static pictures, with file suffixes of .jpg or .jpeg, and is a commonly used picture file format. JPEG adopts a joint coding method including predictive coding (such as DPCM, Differential Pulse-Code Modulation), discrete cosine transform (DCT), and entropy coding, to remove redundant picture data and color data, which belongs to a lossy compression format, and can compress pictures in a small storage space, causing damage to picture data to a certain extent. Especially when an excessively high compression ratio is adopted, the quality of the decompressed restored picture is reduced. If a high-quality picture is required, JPEG should not adopt an excessively high compression ratio.

JPEG-AI (Joint Photographic Experts Group Artificial Intelligence): the scope of JPEG-AI is to create a learning based picture encoding standard that provide a single stream, compact compressed domain representation, which significantly improves compression efficiency compared to a commonly used picture encoding standard under the same subjective quality, effectively enhancing performance in picture processing and computer vision tasks.

JPEG-AI is oriented to a wide range of applications, such as cloud storage, visual management, autonomous vehicle and devices, picture acquisition, storage and management, real-time management of visual data, and media distribution, etc. The goal of JPEG-AI is to design an encoding and decoding solution that significantly improves compression efficiency under the same subjective quality, which provides effective compression domain processing for machine learning-based picture processing and computer vision tasks. JPEG-AI requires hardware and software friendly encoding and decoding, support for 8-bit and 10-bit depths, and efficient encoding and progressive decoding of pictures using text and graphics.

Entropy Encoding: entropy encoding refers to the encoding process that follows the principle of entropy without losing any information, where information entropy is the average amount of information (a measure of uncertainty) of the source. Entropy encoding methods can include but are not limited to: Shannon encoding, Huffman encoding, and arithmetic coding.

Neural Network (NN); the neural network refers to an artificial neural network. The neural network is an operational model composed of a large number of interconnected nodes (or neurons). In the neural network, neuron processing units can represent different objects, such as features, letters, concepts, or some meaningful abstract patterns. The types of processing units in the neural network can be divided into three categories: input units, output units, and hidden units. The input units receive signals and data from the outside. The output units realize the output of processing results. The hidden units are located between the input units and the output units and cannot be observed from outside the system. The connection weight between neurons reflect the strength of the connection between units, and the representation and processing of information are reflected in the connection relationships between processing units. The neural network is a non programmed, brain like information processing method that essentially obtains a parallel distributed information processing function through the transform and dynamic behavior of the neural network, and imitates the information processing function of the nervous system of the human brain to different degrees and levels. In the field of video processing, a commonly used neural network can include but is not limited to: a Convolutional Neural Network (CNN), a Recurrent Neural Network (RNN), or a Fully Connected Network, etc.

Convolutional Neural Network (CNN): the convolutional neural network is a type of feedforward neural network and is one of the most representative network structures in deep learning technology. The artificial neurons of Convolutional Neural Network can respond to surrounding units within a certain coverage area, and have excellent performance in large-scale picture processing. The basic structure of a convolutional neural network consists of two layers, one of which is the feature extraction layer (also referred to as the convolutional layer), and the input of each neuron is connected to a local receptive field of the previous layer and extracts the local features. Once the local features are extracted, a positional relationship between the partial features and other features is also determined. The second layer is the feature mapping layer (also referred to as the activation layer), where each computational layer of the neural network consists of multiple feature maps. Each feature map is a plane, and the weights of all neurons on the plane are equal. The feature mapping structure can use Sigmoid function, ReLU function, Leaky-ReLU function, PReLU function, or GDN function, etc. as the activation function for the convolutional network. In addition, since neurons on one mapping surface share a weight, the number of free parameters in the network is reduced.

For example, one of the advantages of the convolutional neural network over picture processing algorithms is that it avoids the complex pre-processing process (such as extracting artificial features) of the pictures, and can directly input the original picture for end-to-end learning. One of the advantages of the convolutional neural network compared to ordinary neural networks is that ordinary neural networks adopt a fully connected approach, where all neurons from the input layer to the hidden layer are connected, which results in a huge number of parameters, makes network training time-consuming or even difficult. The Convolutional neural network can avoid this difficulty through local connections, weight sharing, and other approaches.

Deconvolution: the deconvolutional layer, also referred to as transposed convolution layer, works similarly to convolution layer. The main difference is that the deconvolutional layer uses padding to make the output greater than the input (the output and the input can also be kept the same). If the stride is 1, it means that the output size is equal to the input size; If stride is N, it means that the width of the output feature is N times the width of the input feature, and the height of the output feature is N times the height of the input feature.

Generalization Ability: the generalization ability can refer to the adaptability of a machine learning algorithm to fresh samples. The purpose of learning is to learn the hidden patterns behind data pairs. For data outside the learning set that has the same pattern, the trained network can further provide appropriate outputs. This ability can be called generalization ability.

Feature: the feature referred to in the present disclosure is a three-dimensional feature matrix of C*W*H. As shown in FIG. 1, which is a schematic diagram of the three-dimensional feature matrix. In the three-dimensional feature matrix, C represents the number of channels, H represents the feature height, and W represents the feature width. The three-dimensional feature matrix can be the input or output of a neural network.

Rate-Distortion Optimized: there are two major indicators for evaluating encoding efficiency, code rate and Peak Signal to Noise Ratio (PSNR). The smaller the bitstream, the higher the compression rate, the higher the PSNR, and the better the quality of the reconstructed picture. In mode selection, the discrimination formula is essentially a comprehensive evaluation of the both. For example, the cost corresponding to a mode: $J(\text{mode})=D+\lambda*R$, where D represents distortion, which can usually be measured using the SSE index. SSE refers to the mean square sum of the differences between the reconstructed picture block and the source picture. To realize cost consideration, the SAD index can also be used, where the SAD refers to the sum of the absolute differences between the reconstructed picture block and the source picture. λ represents the Lagrange multiplier, and R represents the actual number of bits required for picture block encoding in this mode, including the total number of bits required for encoding mode information, motion information, and residuals, etc. When selecting modes, using the Rate-Distortion Optimized to compare and make decisions on encoding modes can usually ensure the best encoding performance.

There are many encoding tools proposed for each module of the encoding end, and each tool usually has multiple modes. For different video sequences, the encoding tools that can achieve optimal encoding performance are often different. Therefore, in the encoding process, Rate-Distortion Optimize (RDO) is usually used to compare the encoding performance of different tools or modes to select the best mode. After determining the optimal tool or mode, the decision information of the tool or mode is transmitted by encoding flag information in the bitstream. Although this approach brings high encoding complexity, it can adaptively select the optimal mode combination for different contents and achieve the best encoding performance. The decoding end can obtain relevant mode information by directly parsing the flag information, with minimal complexity impact.

The following provides a detailed explanation of the decoding and encoding methods in the embodiments of the present disclosure, based on several embodiments.

Figure 2:
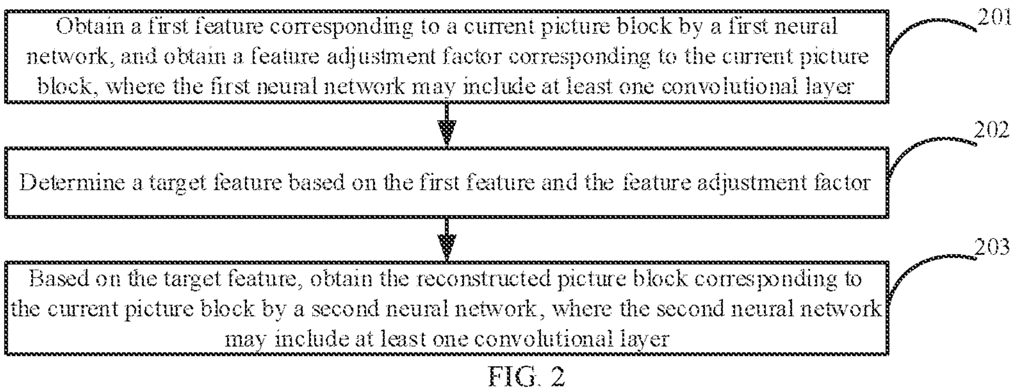
FIG. 2 is a flowchart of a decoding method according to an embodiment of the present disclosure.

Embodiment 1: a decoding method is proposed in the embodiments of the present disclosure, as shown in FIG. 2, which is a flowchart of the method. The method can be applied to the decoding end (also referred to as the video decoder), and can include steps 201 to 203.

In step 201, a first feature corresponding to a current picture block is obtained by a first neural network, and a feature adjustment factor corresponding to the current picture block is obtained. The first neural network may include at least one convolutional layer.

In an embodiment, obtaining the first feature corresponding to the current picture block by the first neural network may include but is not limited to: obtaining a probability distribution parameter based on the first bitstream corresponding to the current picture block; determining a probability distribution model based on the probability distribution parameter, and decoding a second bitstream corresponding to the current picture block based on the probability distribution model to obtain a decoded picture feature; and determining the first feature corresponding to the current picture block based on the decoded picture feature. From the above, it can be seen that in this embodiment, the first neural network is configured to achieve functions such as obtaining the probability distribution parameter, determining the probability distribution model, decoding the second bitstream corresponding to the current picture block, and determining the first feature corresponding to the current picture block.

In another embodiment, obtaining the first feature corresponding to the current picture block by the first neural network can include but is not limited to: obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature; and determining the first feature corresponding to the current picture block based on the residual feature and the predicted value. From the above, it can be seen that in this embodiment, the first neural network is configured to achieve functions such as obtaining the probability distribution parameter, obtaining the predicted value, determining the probability distribution model, decoding the second bitstream corresponding to the current picture block, performing the residual recovery, and determining the first feature corresponding to the current picture block.

For example, obtaining the feature adjustment factor corresponding to the current picture block can include but is not limited to: decoding the auxiliary bitstream corresponding to the current picture block to obtain the feature adjustment factor corresponding to the current picture block, i.e., parsing the feature adjustment factor corresponding to the current picture block from the auxiliary bitstream. Alternatively, a fixed parameter value can be determined as the feature adjustment factor corresponding to the current picture block. For example, a fixed parameter value of 1 can be determined as the feature adjustment factor corresponding to the current picture block.

In step 202, a target feature is determined based on the first feature and the feature adjustment factor.

For example, determining the target feature based on the first feature and the feature adjustment factor can include but is not limited to: performing feature enhancement on the first feature to obtain the second feature; after obtaining the second feature, adjusting the second feature based on the feature adjustment factor to obtain the third feature; after obtaining the third feature, determining the target feature based on the third feature.

In an embodiment, performing feature enhancement on the first feature to obtain the second feature may include but is not limited to: determining an initial feature corresponding to an attention subnetwork based on the first feature; performing feature enhancement on the initial feature by the attention subnetwork to obtain the second feature. After obtaining the second feature, the second feature can be adjusted based on the feature adjustment factor to obtain the third feature (i.e., the adjusted feature is used as the third feature). After obtaining the third feature, determining the target feature based on the third feature may include but is not limited to: determining the third feature as the target feature.

For example, the attention subnetwork may include a residual enhancement subnetwork and a weight generation subnetwork. Performing the feature enhancement on the initial feature by the attention subnetwork to obtain the second feature may include but is not limited to: performing feature enhancement on the initial feature by the residual enhancement subnetwork, to obtain an enhanced feature; generating a weight feature corresponding to the initial feature by the weight generation subnetwork; and generating the second feature based on the initial feature, the enhanced feature and the weight feature.

For example, the weight generation subnetwork includes a residual block subnetwork, a convolutional subnetwork, and a feature mapping subnetwork, and generating the weight feature corresponding to the initial feature by the weight generation subnetwork may include but is not limited to: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

For example, determining the initial feature corresponding to the attention subnetwork based on the first feature can include but is not limited to: performing feature enhancement on the first feature by an initial enhancement subnetwork, to obtain an enhanced feature; and performing upsampling convolution on the enhanced feature by an upsampling convolutional subnetwork, to obtain the initial feature corresponding to the attention subnetwork.

In another embodiment, performing feature enhancement on the first feature to obtain the second feature may include but is not limited to: determining an initial feature corresponding to an attention subnetwork based on the first feature; performing feature enhancement on the initial feature by a first subnetwork of the attention subnetwork to obtain the second feature. After obtaining the second feature, the second feature can be adjusted based on the feature adjustment factor to obtain the third feature (i.e., the adjusted feature is used as the third feature). After obtaining the third feature, determining the target feature based on the third feature may include but is not limited to: processing the third feature by a second subnetwork of the attention subnetwork to obtain a fourth feature, and determining the fourth feature as the target feature.

For example, performing feature enhancement on the initial feature by the first subnetwork of the attention subnetwork to obtain the second feature may include but is not limited to: performing feature enhancement on the initial feature by a residual enhancement subnetwork to obtain an enhanced feature, generating a weight feature corresponding to the initial feature by a weight generation subnetwork, and generating the second feature based on the enhanced feature and the weight feature. Processing the third feature by the second subnetwork of the attention subnetwork to obtain the fourth feature may include but is not limited to: generating the fourth feature based on the initial feature and the third feature.

The weight generation subnetwork includes a residual block subnetwork, a convolutional subnetwork, and a feature mapping subnetwork, and generating the weight feature corresponding to the initial feature by the weight generation subnetwork may include but is not limited to: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

For example, performing feature enhancement on the initial feature by the first subnetwork of the attention subnetwork to obtain the second feature may include but is not limited to: performing feature enhancement on the initial feature by a residual block subnetwork to obtain an enhanced feature, convoluting the enhanced feature by a convolutional subnetwork to obtain a convoluted feature, and determining the second feature based on the convoluted feature. Processing the third feature by the second subnetwork of the attention subnetwork to obtain the fourth feature may include but is not limited to: performing feature mapping on the third feature by a feature mapping subnetwork to obtain weight feature; performing feature enhancement on the initial feature by a residual enhancement subnetwork to obtain an enhanced feature; and generating the fourth feature based on the initial feature, the enhanced feature, and the weight feature.

In the above embodiments, determining the initial feature corresponding to the attention subnetwork based on the first feature can include but is not limited to: performing feature enhancement on the first feature by an initial enhancement subnetwork, to obtain an enhanced feature; and performing upsampling convolution on the enhanced feature by an upsampling convolutional subnetwork, to obtain the initial feature corresponding to the attention subnetwork.

In an embodiment, performing the feature adjustment on the second feature based on the feature adjustment factor, to obtain the third feature may include but is not limited to: when the second feature includes C*H*W feature values, where the C represents a number of channels, the H represents a feature height, and the W represents a feature width, determining feature adjustment values corresponding to the C*H*W feature values based on the feature adjustment factor, and performing feature adjustment on the C*H*W feature values based on the feature adjustment values to obtain adjusted feature values corresponding to the C*H*W feature values. On this basis, the third feature can be generated based on the adjusted feature values corresponding to the C*H*W feature values.

For example, determining the feature adjustment values corresponding to the C*H*W feature values based on the feature adjustment factor may include, but is not limited to: when the feature adjustment factor includes C*H*W feature adjustment values, determining feature adjustment values respectively corresponding to the C*H*W feature values based on the C*H*W feature adjustment values, or when the feature adjustment factor includes H*W feature adjustment values, determining feature adjustment values respectively corresponding to the C*H*W feature values based on the H*W feature adjustment values, or when the feature adjustment factor includes C feature adjustment values, determining feature adjustment values respectively corresponding to the C*H*W feature values based on the C feature adjustment values.

For example, performing the feature adjustment on the C*H*W feature values based on the feature adjustment values to obtain the adjusted feature values corresponding to the C*H*W feature values may include but is not limited to: where for one of the C*H*W feature values, the feature value corresponds to one feature adjustment value, determining the adjusted feature value corresponding to the feature value by the following formula: yr=rf*y, where yr represents the adjusted feature value, rf represents the feature adjustment value, and y represents the feature value. Alternatively, for one of the C*H*W feature values, the feature value corresponds to N+1 feature adjustment values, where N is a positive integer, the adjusted feature value corresponding to that feature value can be determined by the following formula; $yr=rf\_0*y^0+rf\_1*y^1+rf\_2*y^2+\ldots+rf\_N*y^N$, where yr represents the adjusted feature value, rf_0, rf_1, rf_2, . . . , rf_N represent N+1 feature adjustment values, and y represents the feature value.

In step 203, based on the target feature, the reconstructed picture block (i.e., the final output reconstructed picture block) corresponding to the current picture block is obtained by a second neural network. The second neural network may include at least one convolutional layer.

For example, the second neural network may include a reconstruction decoding subnetwork, and obtaining the reconstructed picture block corresponding to the current picture block by the second neural network based on the target feature may include, but is not limited to: processing the target feature by the reconstruction decoding subnetwork to obtain the reconstructed picture block corresponding to the current picture block. For example, the reconstruction decoding subnetwork can include an upsampling convolutional subnetwork, and upsampling convolution is performed by the upsampling convolutional subnetwork on the target feature to obtain the reconstructed picture block corresponding to the current picture block. For example, the reconstruction decoding subnetwork includes an upsampling convolutional subnetwork and a color space transformation subnetwork, and upsampling convolution is performed on the target feature by the upsampling convolutional subnetwork, and color space transformation is performed on a upsampled convoluted feature by the color space transformation subnetwork to obtain the reconstructed picture block corresponding to the current picture block.

In an embodiment, when the feature adjustment mode is enabled for the current picture block, the feature adjustment factor corresponding to the current picture block is obtained, and the target feature is determined based on the first feature and the feature adjustment factor. Alternatively, when the feature adjustment mode is not enabled for the current picture block, the target feature can be determined based on the first feature without obtaining the feature adjustment factor corresponding to the current picture block.

For example, a feature adjustment flag can be parsed from the bitstream. When the feature adjustment flag allows the current picture block to enable the feature adjustment mode, it can be determined that the current picture block enables the feature adjustment mode. Alternatively, a first range of feature values can be parsed from the bitstream. When feature values of the second feature fall within the first range, it can be determined that the current picture block is enabled for feature adjustment mode. Alternatively, the second range of feature change values can be parsed from the bitstream. When the feature change values corresponding to the second feature fall within the second range, it can be determined that the current picture block is enabled for feature adjustment mode.

For example, when an attribute value corresponding to the second feature is within a configured attribute value range, it can be determined that the current picture block is enabled for feature adjustment mode, where the attribute value may include a variance value.

For example, the above execution order is only for the convenience of describing the given examples. In practical applications, the execution order of steps can also be changed without limitation. Moreover, in other embodiments, the steps of the corresponding method can not necessarily be executed in the order shown and described in the present disclosure, and the steps included in the method can be more or less than those described in the present disclosure. In addition, the single step described in the present disclosure can be decomposed into multiple steps for description in other embodiments. The multiple steps described in the present disclosure can also be combined into a single step for description in other embodiments.

As can be seen from the above technical solutions, in the embodiments of the present disclosure, the first feature corresponding to the current picture block is obtained by the first neural network, and the first feature is adjusted based on the feature adjustment factor corresponding to the current picture block to obtain the target feature. Based on the target feature, the reconstructed picture block corresponding to the current picture block is obtained by the second neural network. Thus, an end-to-end video picture compression method is proposed, which can decode video pictures based on neural networks and improve decoding efficiency by combining the feature adjustment factor. Combining the network architecture design and the auxiliary bitstream allows the neural network to effectively ensure the quality of reconstructed picture blocks while maintaining low complexity, which achieves the goal of improving decoding performance and reducing complexity.

Figure 3:
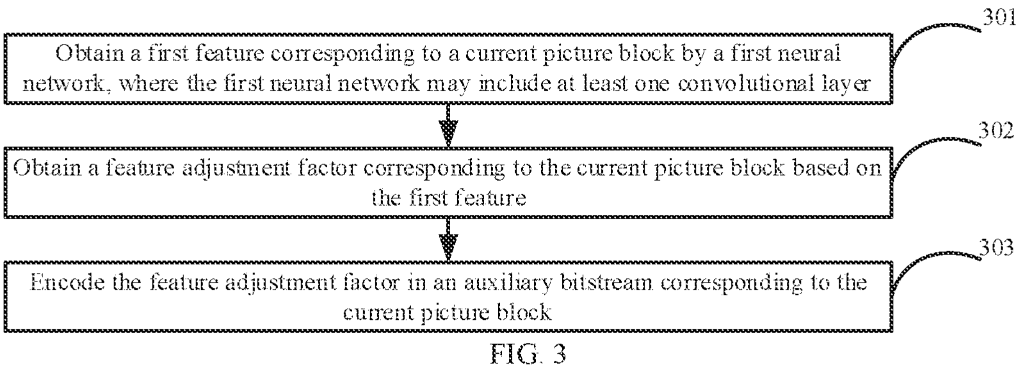
FIG. 3 is a flowchart of an encoding method according to an embodiment of the present disclosure.

Embodiment 2: an encoding method is proposed in the embodiments of the present disclosure, as shown in FIG. 3, which is a flowchart of the method. The method can be applied to an encoding end (also referred to as a video encoder), and can include steps 301 to 303.

In step 301, a first feature corresponding to a current picture block is obtained by a first neural network. The first neural network may include at least one convolutional layer.

In an embodiment, obtaining the first feature corresponding to the current picture block by the first neural network may include but is not limited to: obtaining a probability distribution parameter based on the first bitstream corresponding to the current picture block; determining a probability distribution model based on the probability distribution parameter, and decoding a second bitstream corresponding to the current picture block based on the probability distribution model to obtain a decoded picture feature; and determining the first feature corresponding to the current picture block based on the decoded picture feature. From the above, it can be seen that in this embodiment, the first neural network is configured to achieve functions such as obtaining the probability distribution parameter, determining the probability distribution model, decoding the second bitstream corresponding to the current picture block, and determining the first feature corresponding to the current picture block.

In another embodiment, obtaining the first feature corresponding to the current picture block by the first neural network can include but is not limited to: obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature; and determining the first feature corresponding to the current picture block based on the residual feature and the predicted value. From the above, it can be seen that in this embodiment, the first neural network is configured to achieve functions such as obtaining the probability distribution parameter, obtaining the predicted value, determining the probability distribution model, decoding the second bitstream corresponding to the current picture block, performing the residual recovery, and determining the first feature corresponding to the current picture block.

In step 302, a feature adjustment factor corresponding to the current picture block is obtained based on the first feature.

For example, obtaining the feature adjustment factor corresponding to the current picture block based on the first feature can include but is not limited to: obtaining at least one candidate feature adjustment factor, and determining a rate distortion cost corresponding to each candidate feature adjustment factor based on the first feature. Based on the rate distortion cost corresponding to each candidate feature adjustment factor, a candidate feature adjustment factor can be selected from all candidate feature adjustment factors as the feature adjustment factor corresponding to the current picture block.

In step 303, the feature adjustment factor is encoded in an auxiliary bitstream corresponding to the current picture block.

For example, a fixed parameter value can be determined as the feature adjustment factor corresponding to the current picture block. For example, a fixed parameter value of 1 can be determined as the feature adjustment factor corresponding to the current picture block. In this case, the feature adjustment factor may not be encoded in the auxiliary bitstream corresponding to the current picture block.

For example, the target feature can also be determined based on the first feature corresponding to the current picture block and the feature adjustment factor corresponding to the current picture block. Based on the target feature, the reconstructed picture block (i.e., the final output reconstructed picture block) corresponding to the current picture block can be obtained by the second neural network. The second neural network may include at least one convolutional layer.

For example, determining the target feature based on the first feature and the feature adjustment factor can include but is not limited to: performing feature enhancement on the first feature to obtain the second feature; after obtaining the second feature, adjusting the second feature based on the feature adjustment factor to obtain the third feature; after obtaining the third feature, determining the target feature based on the third feature.

In an embodiment, performing feature enhancement on the first feature to obtain the second feature may include but is not limited to: determining an initial feature corresponding to an attention subnetwork based on the first feature; performing feature enhancement on the initial feature by the attention subnetwork to obtain the second feature. After obtaining the second feature, the second feature can be adjusted based on the feature adjustment factor to obtain the third feature (i.e., the adjusted feature is used as the third feature). After obtaining the third feature, determining the target feature based on the third feature may include but is not limited to: determining the third feature as the target feature.

For example, the attention subnetwork may include a residual enhancement subnetwork and a weight generation subnetwork. Performing the feature enhancement on the initial feature by the attention subnetwork to obtain the second feature may include but is not limited to: performing feature enhancement on the initial feature by the residual enhancement subnetwork, to obtain an enhanced feature; generating a weight feature corresponding to the initial feature by the weight generation subnetwork; and generating the second feature based on the initial feature, the enhanced feature and the weight feature.

For example, the weight generation subnetwork includes a residual block subnetwork, a convolutional subnetwork, and a feature mapping subnetwork, and generating the weight feature corresponding to the initial feature by the weight generation subnetwork may include but is not limited to: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

For example, determining the initial feature corresponding to the attention subnetwork based on the first feature can include but is not limited to: performing feature enhancement on the first feature by an initial enhancement subnetwork, to obtain an enhanced feature; and performing upsampling convolution on the enhanced feature by an upsampling convolutional subnetwork, to obtain the initial feature corresponding to the attention subnetwork.

In another embodiment, performing feature enhancement on the first feature to obtain the second feature may include but is not limited to: determining an initial feature corresponding to an attention subnetwork based on the first feature; performing feature enhancement on the initial feature by a first subnetwork of the attention subnetwork to obtain the second feature. After obtaining the second feature, the second feature can be adjusted based on the feature adjustment factor to obtain the third feature (i.e., the adjusted feature is used as the third feature). After obtaining the third feature, determining the target feature based on the third feature may include but is not limited to: processing the third feature by a second subnetwork of the attention subnetwork to obtain a fourth feature, and determining the fourth feature as the target feature.

For example, performing feature enhancement on the initial feature by the first subnetwork of the attention subnetwork to obtain the second feature may include but is not limited to: performing feature enhancement on the initial feature by a residual enhancement subnetwork to obtain an enhanced feature, generating a weight feature corresponding to the initial feature by a weight generation subnetwork, and generating the second feature based on the enhanced feature and the weight feature. Processing the third feature by the second subnetwork of the attention subnetwork to obtain the fourth feature may include but is not limited to: generating the fourth feature based on the initial feature and the third feature.

The weight generation subnetwork includes a residual block subnetwork, a convolutional subnetwork, and a feature mapping subnetwork, and generating the weight feature corresponding to the initial feature by the weight generation subnetwork may include but is not limited to: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

For example, performing feature enhancement on the initial feature by the first subnetwork of the attention subnetwork to obtain the second feature may include but is not limited to: performing feature enhancement on the initial feature by a residual block subnetwork to obtain an enhanced feature, convoluting the enhanced feature by a convolutional subnetwork to obtain a convoluted feature, and determining the second feature based on the convoluted feature. Processing the third feature by the second subnetwork of the attention subnetwork to obtain the fourth feature may include but is not limited to: performing feature mapping on the third feature by a feature mapping subnetwork to obtain weight feature, performing feature enhancement on the initial feature by a residual enhancement subnetwork to obtain an enhanced feature; and generating the fourth feature based on the initial feature, the enhanced feature, and the weight feature.

In the above embodiments, determining the initial feature corresponding to the attention subnetwork based on the first feature can include but is not limited to: performing feature enhancement on the first feature by an initial enhancement subnetwork, to obtain an enhanced feature; and performing upsampling convolution on the enhanced feature by an upsampling convolutional subnetwork, to obtain the initial feature corresponding to the attention subnetwork.

In an embodiment, performing the feature adjustment on the second feature based on the feature adjustment factor, to obtain the third feature may include but is not limited to: when the second feature includes C*H*W feature values, where the C represents a number of channels, the H represents a feature height, and the W represents a feature width, determining feature adjustment values corresponding to the C*H*W feature values based on the feature adjustment factor, and performing feature adjustment on the C*H*W feature values based on the feature adjustment values to obtain adjusted feature values corresponding to the C*H*W feature values. On this basis, the third feature can be generated based on the adjusted feature values corresponding to the C*H*W feature values.

For example, determining the feature adjustment values corresponding to the C*H*W feature values based on the feature adjustment factor may include, but is not limited to: when the feature adjustment factor includes C*H*W feature adjustment values, determining feature adjustment values respectively corresponding to the C*H*W feature values based on the C*H*W feature adjustment values; or when the feature adjustment factor includes H*W feature adjustment values, determining feature adjustment values respectively corresponding to the C*H*W feature values based on the H*W feature adjustment values; or when the feature adjustment factor includes C feature adjustment values, determining feature adjustment values respectively corresponding to the C*H*W feature values based on the C feature adjustment values.

For example, performing the feature adjustment on the C*H*W feature values based on the feature adjustment values to obtain the adjusted feature values corresponding to the C*H*W feature values may include but is not limited to: where for one of the C*H*W feature values, the feature value corresponds to one feature adjustment value, determining the adjusted feature value corresponding to the feature value by the following formula: yr=rf*y, where yr represents the adjusted feature value, rf represents the feature adjustment value, and y represents the feature value. Alternatively, where for one of the C*H*W feature values, the feature value corresponds to N+1 feature adjustment values, where N is a positive integer, the adjusted feature value corresponding to that feature value can be determined by the following formula: $yr=rf\_0*y^0+rf\_1*y^1+rf\_2*y^2+\ldots+rf\_N*y^N$, where yr represents the adjusted feature value, rf_0, rf_1, rf_2, . . . , rf_N represent N+1 feature adjustment values, and y represents the feature value.

For example, the second neural network may include a reconstruction decoding subnetwork, and obtaining the reconstructed picture block corresponding to the current picture block by the second neural network based on the target feature may include, but is not limited to: processing the target feature by the reconstruction decoding subnetwork to obtain the reconstructed picture block corresponding to the current picture block. For example, the reconstruction decoding subnetwork can include an upsampling convolutional subnetwork, and upsampling convolution is performed by the upsampling convolutional subnetwork on the target feature to obtain the reconstructed picture block corresponding to the current picture block. For example, the reconstruction decoding subnetwork includes an upsampling convolutional subnetwork and a color space transformation subnetwork, and upsampling convolution is performed on the target feature by the upsampling convolutional subnetwork, and color space transformation is performed on a upsampled convoluted feature by the color space transformation subnetwork to obtain the reconstructed picture block corresponding to the current picture block.

In an embodiment, when the feature adjustment mode is enabled for the current picture block, the feature adjustment factor corresponding to the current picture block is obtained based on the first feature, and the feature adjustment factor is encoded in the auxiliary bitstream corresponding to the current picture block. Alternatively, when the feature adjustment mode is not enabled for the current picture block, there is no need to obtain the feature adjustment factor corresponding to the current picture block.

For example, a feature adjustment flag can be encoded in the bitstream, where the feature adjustment flag allows the current picture block to enable feature adjustment mode, or prohibits the current picture block from enabling feature adjustment mode. Alternatively, a first range of feature values can be encoded in the bitstream. Alternatively, a second range of feature change values can be encoded in the bitstream.

For example, the above execution order is only for the convenience of describing the given examples. In practical applications, the execution order of steps can also be changed without limitation. Moreover, in other embodiments, the steps of the corresponding method can not necessarily be executed in the order shown and described in the present disclosure, and the steps included in the method can be more or less than those described in the present disclosure. In addition, the single step described in the present disclosure can be decomposed into multiple steps for description in other embodiments. The multiple steps described in the present disclosure can also be combined into a single step for description in other embodiments.

From the above technical solutions, it can be seen that in the embodiments of the present disclosure, an end-to-end video picture compression method is proposed, which can encode video pictures based on neural networks and improve encoding efficiency by combining the feature adjustment factor. Combining the network architecture design and the auxiliary bitstream (configured to carry the feature adjustment factor) allows the neural network to effectively ensure the quality of reconstructed picture blocks while maintaining low complexity, which achieves the goal of improving encoding performance and reducing complexity.

Figure 4:
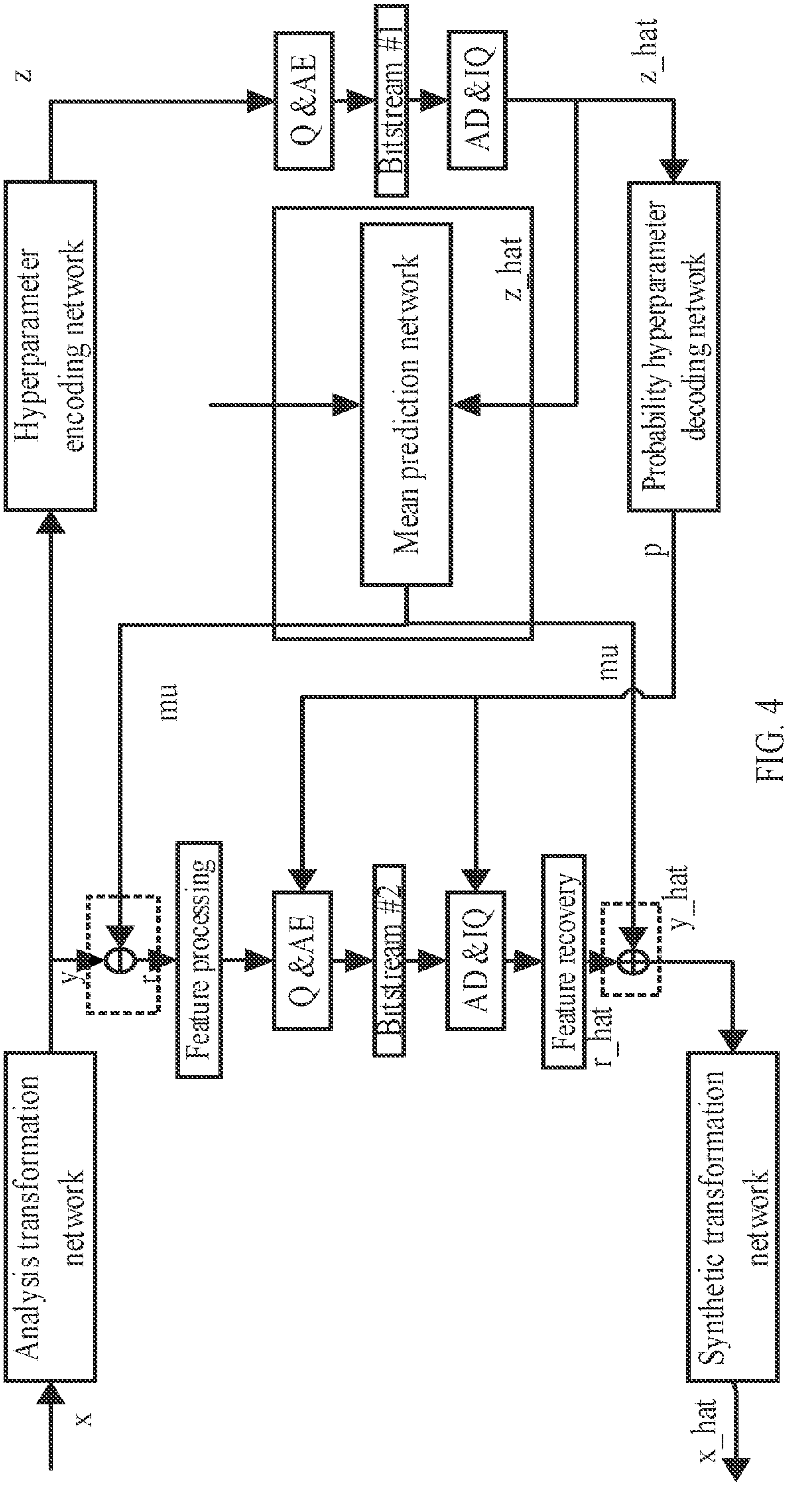
FIG. 4 is a schematic diagram of a processing procedure of an encoding end according to an embodiment of the present disclosure.

Embodiment 3: For Embodiment 1 and Embodiment 2, the processing procedure of the encoding end can be seen in FIG. 4. FIG. 4 is only an example of the processing procedure of the encoding end, which is not limited.

After obtaining the current picture block x (where the current picture block x can be the original picture block x, i.e., the input picture block), the encoding end can analyze and transform the current picture block x through an analysis transformation network (i.e., a neural network) to obtain the picture feature y corresponding to the current picture block x. Where performing feature transformation on the current picture block x by the analysis transformation network refers to: transforming the current picture block x to a picture feature y in a latent domain, thereby facilitating all subsequent processes to operate in the latent domain.

A picture can be divided into one picture block or multiple picture blocks. If the picture is divided into one picture block, the current picture block x can also be a picture, which means that the encoding and decoding process for the picture block can be directly applied to the picture.

After obtaining the picture feature y, the encoding end performs coefficient hyperparameter feature transformation on the picture feature y to obtain the coefficient hyperparameter feature z. For example, the picture feature y can be input to a hyperparameter encoding network (i.e., a neural network), where the hyperparameter encoding network performs coefficient hyperparameter feature transformation on the picture feature y to obtain the coefficient hyperparameter feature z. Where the hyperparameter encoding network can be a trained neural network. The training process of the hyperparameter encoding network is not limited, as long as the trained hyperparameter encoding network can perform the coefficient hyperparameter feature transformation on the picture feature y. Where the picture feature y in the latent domain is processed by a hyperparameter encoding network to obtain hyper prior latent information z.

After obtaining the coefficient hyperparameter feature z, the encoding end can quantize the coefficient hyperparameter feature z to obtain the hyperparameter quantized feature corresponding to the coefficient hyperparameter feature z, where the Q operation in FIG. 4 represents the quantization process. After the hyperparameter quantized feature corresponding to the coefficient hyperparameter feature z is obtained, the hyperparameter quantized feature is encoded to obtain the Bitstream #1 (i.e., the first bitstream) corresponding to the current picture block. The AE operation in FIG. 4 represents the encoding process, such as entropy encoding. Alternatively, the encoding end can directly encode the coefficient hyperparameter feature z to obtain the Bitstream #1 corresponding to the current picture block. Where the hyperparameter quantized feature or coefficient hyperparameter feature z carried in Bitstream #1 is mainly used to obtain the mean and the parameter of the probability distribution model.

After obtaining the Bitstream #1 corresponding to the current picture block, the encoding end can transmit the Bitstream #1 corresponding to the current picture block to the decoding end. The processing procedure of the decoding end for the Bitstream #1 corresponding to the current picture block is referred to the subsequent embodiments.

After obtaining the Bitstream #1 corresponding to the current picture block, the encoding end can also decode Bitstream #1 to obtain hyperparameter quantized feature. AD in FIG. 4 represents the decoding process. Then, the hyperparameter quantized feature are inverse quantized to obtain the coefficient hyperparameter feature z_hat, where the coefficient hyperparameter feature z_hat can be the same or different from the coefficient hyperparameter feature z. The IQ operation in FIG. 4 represents the inverse quantization process. Alternatively, after obtaining the Bitstream #1 corresponding to the current picture block, the encoding end can also decode Bitstream #1 to obtain the coefficient hyperparameter feature z_hat, without involving the inverse quantization process of the coefficient hyperparameter feature z_hat.

For the encoding process of Bitstream #1, an encoding method with a fixed probability density model can be used, and for the decoding process of Bitstream #1, a decoding method with a fixed probability density model can be used, which is not limited.

After obtaining the coefficient hyperparameter feature z_hat, the encoding end can perform context-based prediction based on the coefficient hyperparameter feature z_hat of the current picture block and the residual feature y_hat of the previous picture block (the determination process of residual feature y_hat is described in the subsequent embodiments), to obtain the predicted value mu (i.e., mean mu) corresponding to the current picture block. For example, the coefficient hyperparameter feature z_hat and residual feature y_hat are input to the mean prediction network, and the mean prediction network determines the predicted value mu based on the coefficient hyperparameter feature z_hat and residual feature y_hat. This prediction process is not limited. Where for the context-based prediction process, the input includes the coefficient hyperparameter feature z_hat and the decoded residual feature y_hat, where the initial coefficient hyperparameter feature z_hat and the decoded residual feature y_hat are jointly input to obtain a more accurate predicted value mu. The predicted value mu is used to be subtracted from the original feature to obtain the residual and to be added to the decoded residual to obtain the reconstructed y.

It should be noted that the mean prediction network is an optional neural network. That is, the mean prediction network can be omit, which means there is no need to determine the predicted value mu through the mean prediction network. The dashed box in FIG. 4 indicates that the mean prediction network is optional.

After obtaining the picture feature y, the encoding end can determine the residual feature r based on the picture feature y and the predicted value mu, such as taking the difference between the picture feature y and the predicted value mu as the residual feature r. Then, the residual feature r is subjected to feature processing to obtain the picture feature s. The feature processing process is not limited and can be any feature processing method. In this case, it is necessary to deploy a mean prediction network to provide the predicted value mu. Alternatively, after obtaining the picture feature y, the encoding end can perform feature processing on the picture feature y to obtain the picture feature s. The feature processing process is not limited and can be any feature processing method. In this case, there is no need to deploy a mean prediction network, and the residual process is represented by a dashed box as an optional process.

After obtaining the picture feature s, the encoding end can quantize the picture feature s to obtain the corresponding picture quantized feature. The Q operation in FIG. 4 represents the quantization process. After obtaining the picture quantized feature corresponding to the picture feature s, the encoding end can encode the picture quantized feature to obtain the Bitstream #2 (i.e., the second bitstream) corresponding to the current picture block. The AE operation in FIG. 4 represents the encoding process, such as the entropy encoding process. Alternatively, the encoding end can directly encode the picture feature s to obtain the Bitstream #2 corresponding to the current picture block, without involving the quantization process of the picture feature s.

After obtaining the Bitstream #2 corresponding to the current picture block, the encoding end can transmit the Bitstream #2 corresponding to the current picture block to the decoding end. The processing procedure of the decoding end for the Bitstream #2 corresponding to the current picture block is referred to the subsequent embodiments.

After obtaining the Bitstream #2 corresponding to the current picture block, the encoding end can further decode Bitstream #2 to obtain the picture quantized feature. The AD in FIG. 4 represents the decoding process. Then, the encoding end can perform inverse quantization on the picture quantized feature to obtain a picture feature s', where the picture feature s' can be the same or different from the picture feature s. The IQ operation in FIG. 4 represents the inverse quantization process. Alternatively, after obtaining the Bitstream #2 corresponding to the current picture block, the encoding end can further decode Bitstream #2 to obtain the picture feature s', without involving the inverse quantization process of picture quantized feature.

After obtaining the picture feature s', the encoding end can perform feature recovery (i.e., the inverse process of the feature processing) on the picture feature s', to obtain the residual feature r_hat. There are no restrictions on this feature recovery process, and any feature recovery method can be used. The residual feature r_hat can be the same or different from the residual feature r. After obtaining the residual feature r_hat, the encoding end determines the picture feature y_hat based on the residual feature r_hat and the predicted value mu. The picture feature y_hat and the picture feature y can be the same or different. For example, the sum of the residual feature r_hat and the predicted value mu is taken as the picture feature y_hat. In this case, it is necessary to deploy a mean prediction network to provide the predicted value mu. Alternatively, after obtaining the picture feature s', the encoding end can perform feature recovery (i.e., the inverse process of the feature processing) on the picture feature s' to obtain the picture feature y_hat, where the picture feature y_hat can be the same or different from the picture feature y. In this case, there is no need to deploy a mean prediction network, and the residual process is represented by a dashed box as an optional process.

After obtaining the picture feature y_hat, the encoding end can perform a synthesis transformation on the picture feature y_hat to obtain the reconstructed picture block x_hat corresponding to the current picture block x. For example, the picture feature y_hat is input to the synthesis transformation network, where the synthesis transformation network synthesizes and transforms the picture feature y_hat to obtain the reconstructed picture block x_hat. Then, the picture reconstruction process is completed.

In an embodiment, when encoding the picture quantized feature or the picture feature s to obtain the Bitstream #2 corresponding to the current picture block, the encoding end needs to first determine a probability distribution model, and then encode the picture quantized feature or picture feature s based on the probability distribution model. In addition, when decoding Bitstream #2, the encoding end also needs to first determine the probability distribution model, and then decode Bitstream #2 based on the probability distribution model.

To obtain the probability distribution model, as shown in FIG. 4, after obtaining the coefficient hyperparameter feature z_hat, the encoding end can perform coefficient hyperparameter feature inverse transformation on the coefficient hyperparameter feature z_hat, to obtain the probability distribution parameter p. For example, the coefficient hyperparameter feature z_hat is input to the probability hyperparameter decoding network, where the probability hyperparameter decoding network performs coefficient hyperparameter feature inverse transformation on the coefficient hyperparameter feature z_hat to obtain the probability distribution parameter p. After obtaining the probability distribution parameter p, the encoding end can generate a probability distribution model based on the probability distribution parameter p. The probability hyperparameter decoding network can be a trained neural network. The training process of the probability hyperparameter decoding network is not limited, as long as the probability hyperparameter decoding network can perform coefficient hyperparameter feature inverse transformation on the coefficient hyperparameter feature z_hat.

In an embodiment, the processing of the encoding end described above is performed by a deep learning model or a neural network model, thereby achieving end-to-end picture compression and encoding processes, which is not limited.

Figure 5:
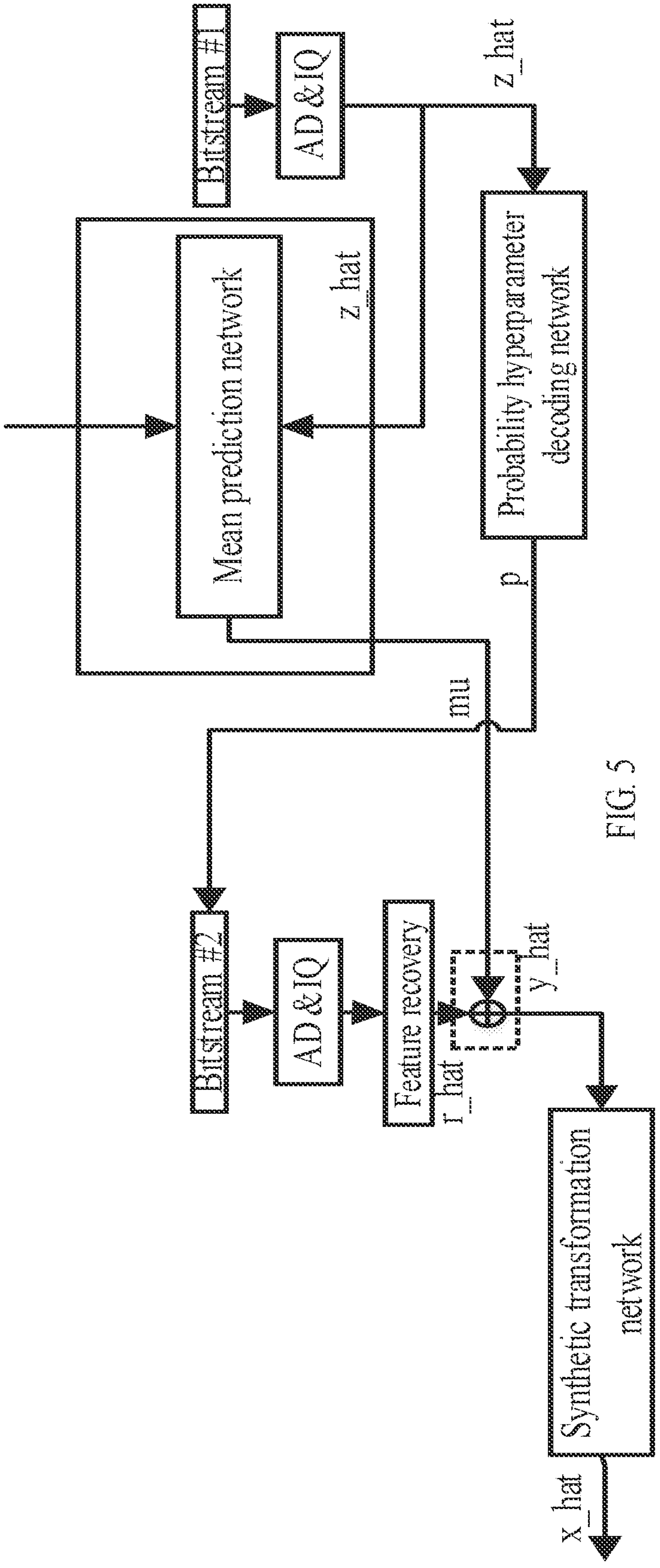
FIG. 5 is a schematic diagram of a processing procedure of a decoding end according to an embodiment of the present disclosure.

Embodiment 4: for Embodiment 1 and Embodiment 2, the processing procedure of the decoding end can be seen in FIG. 5. FIG. 5 is only an example of the processing procedure of the decoding end, which is not limited.

After obtaining the Bitstream #1 corresponding to the current picture block, the decoding end can also decode Bitstream #1 to obtain hyperparameter quantized feature. AD in FIG. 5 represents the decoding process. Then, the hyperparameter quantized feature are inverse quantized to obtain the coefficient hyperparameter feature z_hat, where the coefficient hyperparameter feature z_hat can be the same or different from the coefficient hyperparameter feature z. The IQ operation in FIG. 5 represents the inverse quantization process. Alternatively, after obtaining the Bitstream #1 corresponding to the current picture block, the decoding end can also decode Bitstream #1 to obtain the coefficient hyperparameter feature z_hat, without involving the inverse quantization process of the coefficient hyperparameter feature z_hat.

For the decoding process of Bitstream #1, a decoding method with a fixed probability density model can be used, which is not limited.

A picture can be divided into one picture block or multiple picture blocks. If the picture is divided into one picture block, the current picture block x can also be a picture, which means that the decoding process for the picture block can be directly applied to the picture.

After obtaining the coefficient hyperparameter feature z_hat, the decoding end can perform context-based prediction based on the coefficient hyperparameter feature z_hat of the current picture block and the residual feature y_hat of the previous picture block (the determination process of residual feature y_hat is described in the subsequent embodiments), to obtain the predicted value mu (i.e., mean mu) corresponding to the current picture block. For example, the coefficient hyperparameter feature z_hat and residual feature y_hat are input to the mean prediction network, and the mean prediction network determines the predicted value mu based on the coefficient hyperparameter feature z_hat and residual feature y_hat. This prediction process is not limited. Where for the context-based prediction process, the input includes the coefficient hyperparameter feature z_hat and the decoded residual feature y_hat, where the initial coefficient hyperparameter feature z_hat and the decoded residual feature y_hat are jointly input to obtain a more accurate predicted value mu.

It should be noted that the mean prediction network is an optional neural network. That is, the mean prediction network can be omit, which means there is no need to determine the predicted value mu through the mean prediction network. The dashed box in FIG. 5 indicates that the mean prediction network is optional.

After obtaining the Bitstream #2 corresponding to the current picture block, the decoding end can further decode Bitstream #2 to obtain the picture quantized feature. The AD in FIG. 5 represents the decoding process. Then, the decoding end can perform inverse quantization on the picture quantized feature to obtain a picture feature s', where the picture feature s' can be the same or different from the picture feature s. The IQ operation in FIG. 5 represents the inverse quantization process. Alternatively, after obtaining the Bitstream #2 corresponding to the current picture block, the decoding end can further decode Bitstream #2 to obtain the picture feature s', without involving the inverse quantization process of picture quantized feature.

After obtaining the picture feature s', the decoding end can perform feature recovery (i.e., the inverse process of the feature processing) on the picture feature s' to obtain the residual feature r_hat, where the residual feature r_hat is the same or different from the residual feature r. After obtaining the residual feature r_hat, the decoding end determines the picture feature y_hat based on the residual feature r_hat and the predicted value mu. The picture feature y_hat and the picture feature y are the same or different. For example, the sum of the residual feature r_hat and the predicted value mu is taken as the picture feature y_hat. In this case, it is necessary to deploy a mean prediction network to provide the predicted value mu. Alternatively, after obtaining the picture feature s', the decoding end can perform feature recovery on the picture feature s' to obtain the picture feature y_hat, where the picture feature y_hat can be the same or different from the picture feature y. In this case, there is no need to deploy a mean prediction network, and the residual process is represented by a dashed box as an optional process.

After obtaining the picture feature y_hat, the decoding end can perform a synthesis transformation on the picture feature y_hat to obtain the reconstructed picture block x_hat corresponding to the current picture block x. For example, the picture feature y_hat is input to the synthesis transformation network, where the synthesis transformation network synthesizes and transforms the picture feature y_hat to obtain the reconstructed picture block x_hat. Then, the picture reconstruction process is completed.

In an embodiment, when decoding Bitstream #2, the decoding end needs to first determine the probability distribution model, and then decode Bitstream #2 based on the probability distribution model. To obtain the probability distribution model, as shown in FIG. 5, after obtaining the coefficient hyperparameter feature z_hat, the decoding end can perform coefficient hyperparameter feature inverse transformation on the coefficient hyperparameter feature z_hat, to obtain the probability distribution parameter p. For example, the coefficient hyperparameter feature z_hat is input to the probability hyperparameter decoding network, where the probability hyperparameter decoding network performs coefficient hyperparameter feature inverse transformation on the coefficient hyperparameter feature z_hat to obtain the probability distribution parameter p. After obtaining the probability distribution parameter p, the encoding end can generate a probability distribution model based on the probability distribution parameter p. The probability hyperparameter decoding network can be a trained neural network. The training process of the probability hyperparameter decoding network is not limited, as long as the probability hyperparameter decoding network can perform coefficient hyperparameter feature inverse transformation on the coefficient hyperparameter feature z_hat to obtain the probability distribution apparatus p.

In an embodiment, the processing of the decoding end described above is performed by a deep learning model or a neural network model, thereby achieving end-to-end picture compression and encoding processes, which is not limited.

Figure 6A:
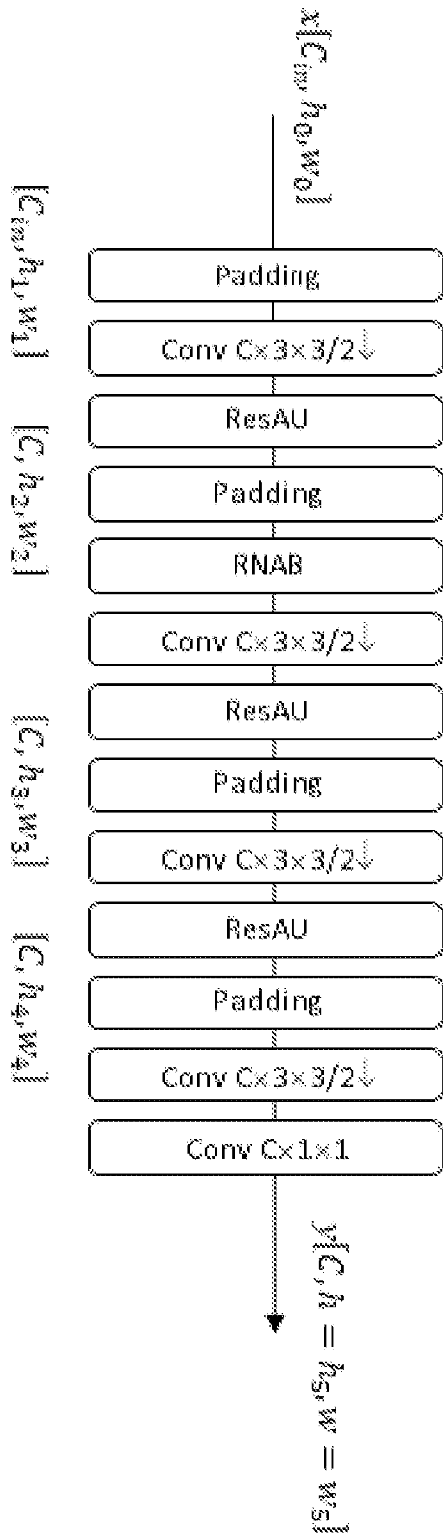
FIGS. 6A-6H are schematic diagrams of network structures according to embodiments of the present disclosure.
Figure 6B:
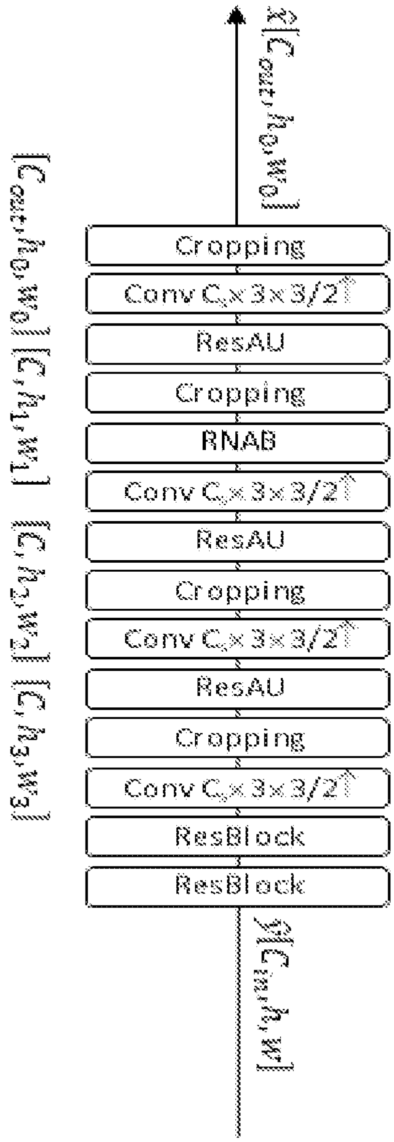

Embodiment 5: for Embodiments 1, 2, 3, and 4, an analysis transformation network is involved at the encoding end, and a synthesis transformation network is involved at the encoding end and the decoding end. Both the analysis transformation network and the synthesis transformation network are neural networks. In an embodiment, the schematic structural diagram of the analysis transformation network can be seen in FIG. 6A, and the schematic structural diagram of the synthesis transformation network can be seen in FIG. 6B. Of course, FIGS. 6A and 6B are only examples, and in the embodiments, the structures of the analysis transformation network and the synthesis transformation network are not limited, as long as they can achieve the analysis transformation function and the synthesis transformation function.

The analysis transformation network sequentially includes the Padding layer, Conv layer, ResAU layer, Padding layer, RNAB layer, Conv layer, ResAU layer, Padding layer, Conv layer, ResAU layer, Padding layer, Conv layer, and Conv layer. The Padding laver is a padding layer used to achieve edge expansion of a feature. The Conv layer is a convolutional laver used to perform a convolution operation on a feature. C*3*3 represents that a 3*3 convolution kernel (C channels) is used to perform a convolution operation on a feature, C*1*1 represents that a 1*1 convolution kernel (C channels) is used to perform a convolution operation on a feature, and the down arrow of 2 represents the down sampling of a feature by a factor of 2.

Figure 6C:
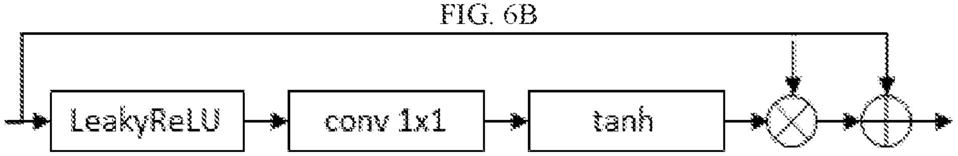

The ResAU layer is an activation layer. The schematic structural diagram of the ResAU layer can be seen in FIG. 6C, where LeakyReLU represents an activation operation. Conv 1*1 represents a convolution operation of a feature using a 1*1 convolution kernel, and tanh represents the hyperbolic tangent operation.

The RNAB layer is a residual non-local attention block. The schematic structural diagram of the RNAB layer can be seen in FIG. 6D. The RNAB layer can include an RB layer, a Conv layer, and a sigmoid layer. In the Conv layer, the up arrow of 2 represents up sampling of a feature by a factor of 2. The sigmoid layer is used for feature mapping, such as using the sigmoid function to map features to an interval (0,1).

The RB (Residual Blocks) layer is a residual block. The schematic structural diagram of the RB layer can be seen in FIG. 6E, where the RB layer can include a Conv layer, a LeakyReLU, and a Conv layer. The Conv layer uses a 3*3 convolutional kernel.

The synthetic transformation network sequentially includes a ResBlock layer (i.e., RB layer), a ResBlock layer, a Conv layer, a Cropping layer, a ResAU layer, a Conv layer, a Cropping layer, a ResAU layer, a Conv layer, an RNAB layer, a Cropping layer, a ResAU layer, a Conv layer, and a Cropping layer. The ResBlock layer is a residual block, and the schematic structural diagram of the ResBlock layer can be seen in FIG. 6E. The Conv layer is a convolutional layer used to perform a convolution operation on a feature. C*3*3 represents that a 3*3 convolution kernel (C channels) is used to perform a convolution operation on a feature, and the up arrow of 2 represents the up sampling of a feature by a factor of 2. The Cropping layer is configured to implement the feature cropping operation, which is the inverse of the padding operation. The ResAU layer is an activation layer, and the schematic structural diagram of the ResAU layer can be seen in FIG. 6C. The RNAB layer is a residual non-local attention block. The schematic structural diagram of the RNAB layer can be seen in FIG. 6D. The RNAB layer can include an RB layer, a Conv layer, and a sigmoid layer.

Embodiment 6: for Embodiment 5, as shown in FIG. 6B, the synthetic transformation network mainly includes four upsampling **3*3** convolutional layers, two ResBlock layers (where the ResBlock layer includes two 3*3 convolutional layers), three activation layers ResAU (where the ResAU includes one 1*1 convolutional layer), and one RNAB layer (where the RNAB layer includes nine RB blocks and three 3*3 convolutional layers, total twenty-one 3*3 convolutional layers). From the above, it can be seen that the synthetic transformation network has a total of twenty-nine 3*3 convolutional layers and three 1*1 convolutional layers, and the RNAB layer accounts for nearly 70% of the complexity, indicating that the complexity of the RNAB layer has a large optimization space. Based on this, in this embodiment, the synthesis transformation network can be optimized to design a low complexity, high-performance synthesis transformation network. Alternatively, the analysis transformation network can be optimized to design a low complexity, high-performance analysis transformation network. Of course, other high complexity network structures can also be optimized to design low complexity, high-performance network structures, which are not limited in this embodiment. For the convenience of description, in the embodiments, optimization of the synthetic transformation network is taken as an example. For example, complex networks similar to the RNAB layer in the synthetic transformation network can be optimized. Of course, other network sides in the synthesis transformation network can also be optimized without limitation, as long as the complexity of the synthesis transformation network can be simplified.

Figure 6D:
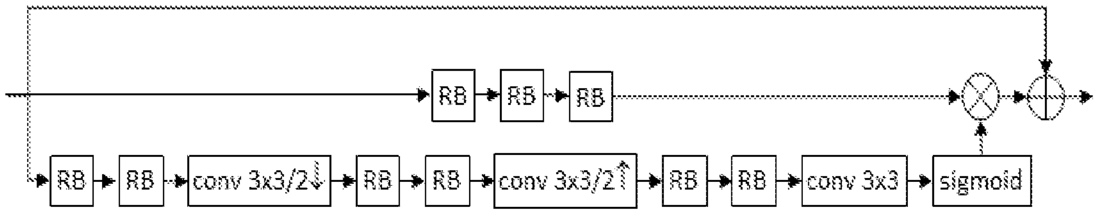
Figure 6E:
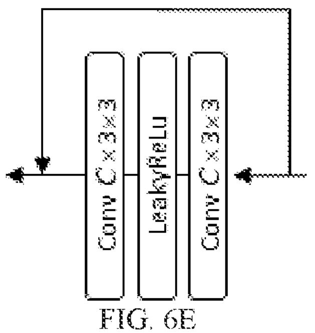
Figure 6F:
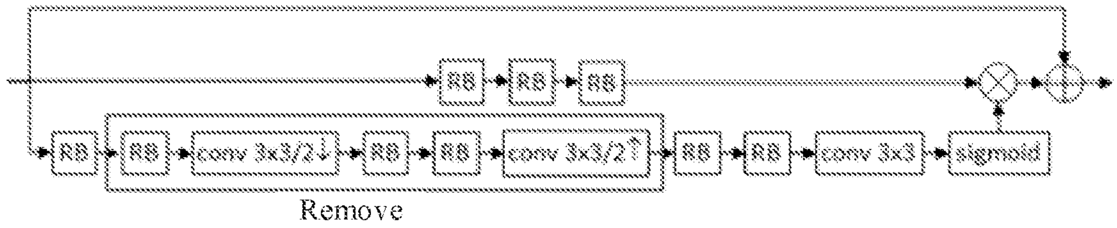

In an embodiment, for the RNAB layer shown in FIG. 6D, the RNAB layer can include 9 RB layers, 3 Conv layers, and 1 sigmoid layer. Based on this, some network layers can be removed to obtain an optimized RNAB layer. As shown in FIG. 6F, 3 RB layers and 2 Conv layers can be removed to obtain an optimized RNAB layer. Of course, other network layers can also be removed to obtain an optimized RNAB layer, and there is no limitation on the removal method of the network layer.

Figure 6G:
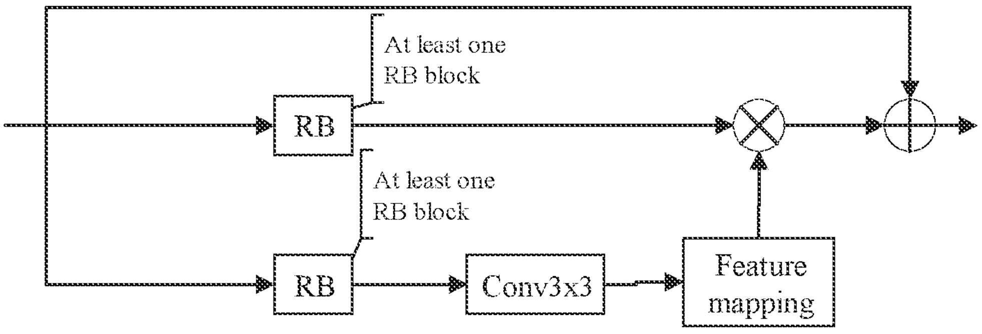

For example, the optimized RNAB layer can be seen in FIG. 6G. The RNAB layer can include an RB layer (composed of at least one RB block, such as three sequential RB blocks, and of course, the number of RB blocks can be more or less), an RB layer (composed of at least one RB block, such as three sequential RB blocks, of course, and the number of RB blocks can be more or less), one Conv layer (such as a 3*3 Conv layer), and one sigmoid layer (i.e., feature mapping layer).

For example, the 3*3 Conv layer can be replaced with a 1*1 Conv layer or a 5*5 Conv layer. Taking the 1*1 Conv layer as an example, the optimized RNAB layer can be shown in FIG. 6H. The RNAB layer can include an RB layer, an RB layer, a Conv layer (such as a 1*1 Conv layer), and a sigmoid layer (i.e., a feature mapping layer).

For example, after the optimized RNAB layer is obtained, the optimized RNAB layer can be substituted into FIG. 6B to obtain the optimized synthetic transformation network. Based on the optimized synthetic transformation network, the picture feature y_hat can be input to the synthetic transformation network, where the synthetic transformation network performs a synthetic transformation on the picture feature y_hat to obtain the reconstructed picture block x_hat.

Embodiment 7: for Embodiment 5, the synthesis transformation network can be optimized to design a low complexity, high-performance synthesis transformation network. Alternatively, the analysis transformation network can be optimized to design a low complexity, high-performance analysis transformation network. Of course, other high complexity network structures can also be optimized to design low complexity, high-performance network structures. In the embodiments, the method of "simplified network structure+adaptive adjustment factor" can be used for encoding and decoding.

Firstly, the complex network can be simplified to obtain a simplified network. For example, the synthetic transformation network can be simplified to obtain a simplified synthetic transformation network, such as simplifying the RNAB layer (i.e., the complex network) in the synthetic transformation network to obtain a simplified synthetic transformation network. Of course, other networks can also be simplified, which is not limited.

Then, a feature (such as key feature) of at least one layer of the simplified network is adjusted. For example, a simplified network is trained on a large number of pictures, and its generated features have universal effects. However, for a specific picture frame, the feature is often not optimal. Therefore, a customized feature needs to be designed for the picture. To obtain this customized feature, a feature adjustment factor needs to be introduced in a certain process of the network, and the feature needs to be adjusted based on the feature adjustment factor to obtain the adjusted customized feature. For example, the encoding end adaptively selects a feature adjustment factor for the current picture block and encodes the feature adjustment factor in the bitstream, and the decoding end can parse the feature adjustment factor from the bitstream.

Figure 7A:
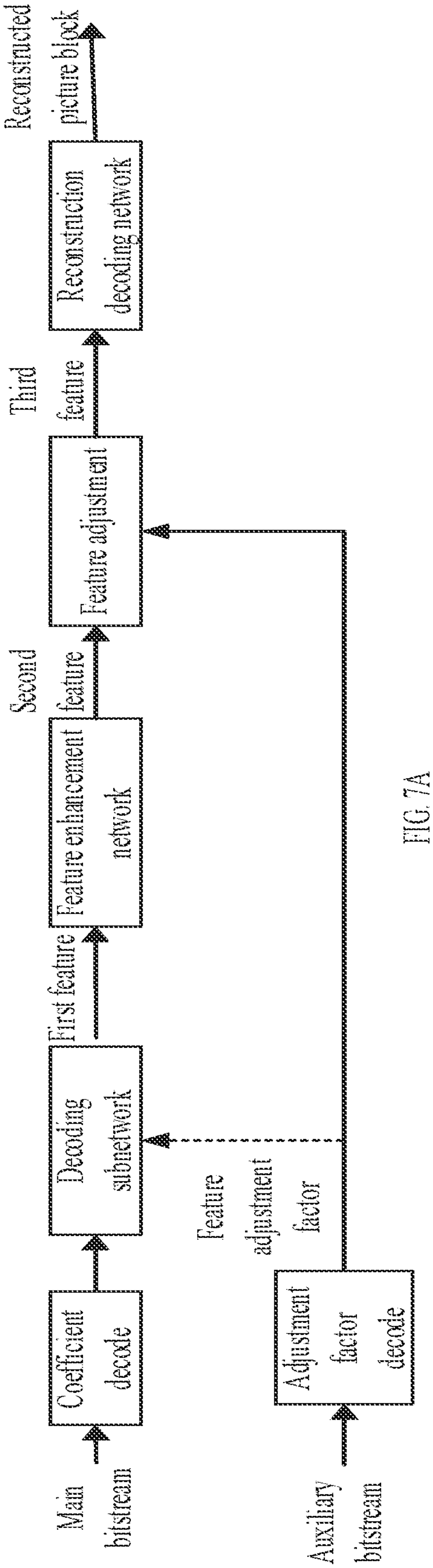
FIG. 7A is a schematic diagram of a processing procedure of a decoding end according to an embodiment of the present disclosure.

In an embodiment, the decoding method for the decoding end can be seen in FIG. 7A. The decoding end can receive the main bitstream (i.e., the first bitstream Bitstream #1 and the second bitstream Bitstream #2) for the current picture block. The main bitstream is subjected to the coefficient decoding and the decoding subnetwork to obtain the first feature corresponding to the current picture block. The decoding end can decode the feature adjustment factor corresponding to the current picture block from the auxiliary bitstream. After the first feature corresponding to the current picture block is obtained, the first feature can be enhanced by a feature enhancement network to obtain the second feature, and the feature adjustment factor corresponding to the current picture block can be used to perform feature adjustment on the second feature to obtain the third feature. After the third feature is obtained, the target feature corresponding to the current picture block can be determined based on the third feature, and the target feature can be input to the reconstruction decoding network. The reconstruction decoding network processes the target feature to obtain the reconstructed picture block corresponding to the current picture block.

For example, the feature adjustment factor can be decoded from the auxiliary bitstream by the decoding end, or the feature adjustment factor can also be a fixed parameter value. When the feature adjustment factor is a fixed parameter value, such as when the feature adjustment factor is a fixed parameter value of 1, which is equivalent to not adjusting the second feature, i.e., not involving the feature adjustment process, which is equivalent to the solution of Embodiment 6.

For example, the decoding end can also decode the feature adjustment factor (which is the same or different from the feature adjustment factor for the second feature) for the decoding subnetwork from the auxiliary bitstream. After the feature adjustment factor for the decoding subnetwork is obtained, a certain feature in the decoding subnetwork can be adjusted based on the feature adjustment factor. For example, after feature A (which is any feature in the decoding subnetwork) is obtained, the decoding subnetwork can use the feature adjustment factor to adjust feature A to obtain the adjusted feature B. The decoding subnetwork continues to process based on feature B, ultimately obtaining the first feature. By using feature adjustment factor in certain decoding processes of the decoding subnetwork, the first feature with smaller distortion can be generated.

Figure 7B:
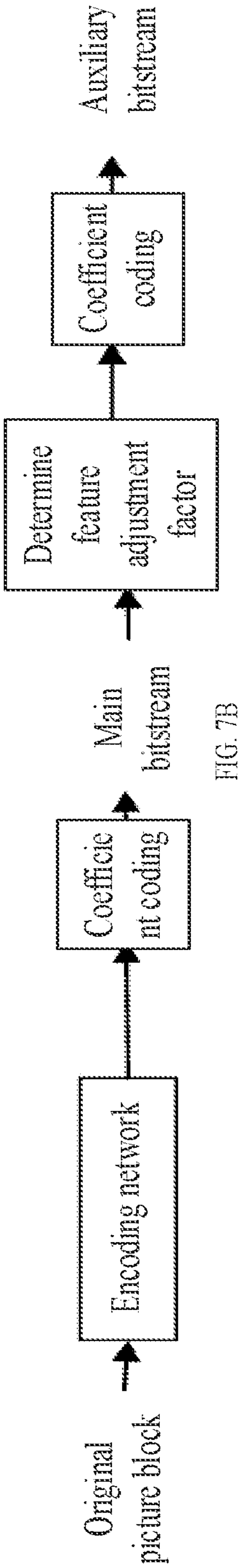
FIG. 7B is a schematic diagram of a processing procedure of an encoding end according to an embodiment of the present disclosure.

In an embodiment, for the encoding end, the encoding method of the encoding end can be seen in FIG. 7B. After the current picture block is subjected to the encoding network and coefficient encoding, the corresponding main bitstream (i.e., the first bitstream Bitstream #1 and the second bitstream Bitstream #2) of the current picture block can be obtained. The encoding end can transmit the main bitstream of the current picture block to the decoding end.

The main bitstream can be subjected to the coefficient decoding and the decoding subnetwork, to obtain the first feature corresponding to the current picture block. Based on the first feature, the feature adjustment factor corresponding to the current picture block can be obtained, and the feature adjustment factor can be encoded in the auxiliary bitstream corresponding to the current picture block, such that the decoding end can decode the feature adjustment factor corresponding to the current picture block from the auxiliary bitstream.

For example, the encoding end can obtain at least one candidate feature adjustment factor (for example, a candidate feature adjustment factor list can be preset, and all feature adjustment factors in the candidate feature adjustment factor list can be determined as candidate feature adjustment factors, or at least one candidate feature adjustment factor can be generated using an algorithm, which is not limited). The rate distortion cost corresponding to each candidate feature adjustment factor can be determined based on the first feature. For example, for each candidate feature adjustment factor, after obtaining the first feature corresponding to the current picture block, the first feature can be enhanced by a feature enhancement network to obtain the second feature, and the candidate feature adjustment factor can be used to adjust the second feature to obtain the third feature. After the third feature is obtained, the target feature corresponding to the current picture block can be determined based on the third feature, and the target feature can be input to the reconstruction decoding network. The reconstruction decoding network processes the target feature to obtain the reconstructed picture block corresponding to the current picture block. After obtaining the reconstructed picture block, the rate distortion cost corresponding to the candidate feature adjustment factor can be determined based on the loss between the reconstructed picture block and the current picture block, thereby obtaining the rate distortion cost corresponding to each candidate feature adjustment factor. After obtaining the rate distortion cost corresponding to each candidate feature adjustment factor, based on the rate distortion cost corresponding to each candidate feature adjustment factor, a candidate feature adjustment factor is selected from all candidate feature adjustment factors as the feature adjustment factor corresponding to the current picture block. For example, the candidate feature adjustment factor with the lowest rate distortion cost is selected as the feature adjustment factor corresponding to the current picture block.

For example, the encoding end can also obtain feature adjustment factor for the decoding subnetwork, and adjust a certain feature in the decoding subnetwork based on the feature adjustment factor. For example, after obtaining feature A (which is any feature in the decoding subnetwork), the decoding subnetwork can use this feature adjustment factor to adjust feature A to obtain the adjusted feature B. The decoding subnetwork continues to process based on feature B, ultimately obtaining the first feature. On this basis, the encoding end can further encode feature adjustment factor (the same or different from the feature adjustment factor for the second feature) for the decoding subnetwork in the auxiliary bitstream, such that the decoding end can decode the feature adjustment factor for the decoding subnetwork from the auxiliary bitstream.

Embodiment 8: for Embodiments 1 to 7, for both the encoding and decoding ends, the first neural network can be used to obtain the first feature corresponding to the current picture block. For example, a probability distribution parameter is obtained based on the first bitstream corresponding to the current picture block; a probability distribution model is determined based on the probability distribution parameter, and a second bitstream corresponding to the current picture block is decoded based on the probability distribution model to obtain a decoded picture feature; and the first feature corresponding to the current picture block is determined based on the decoded picture feature.

Figure 8A:
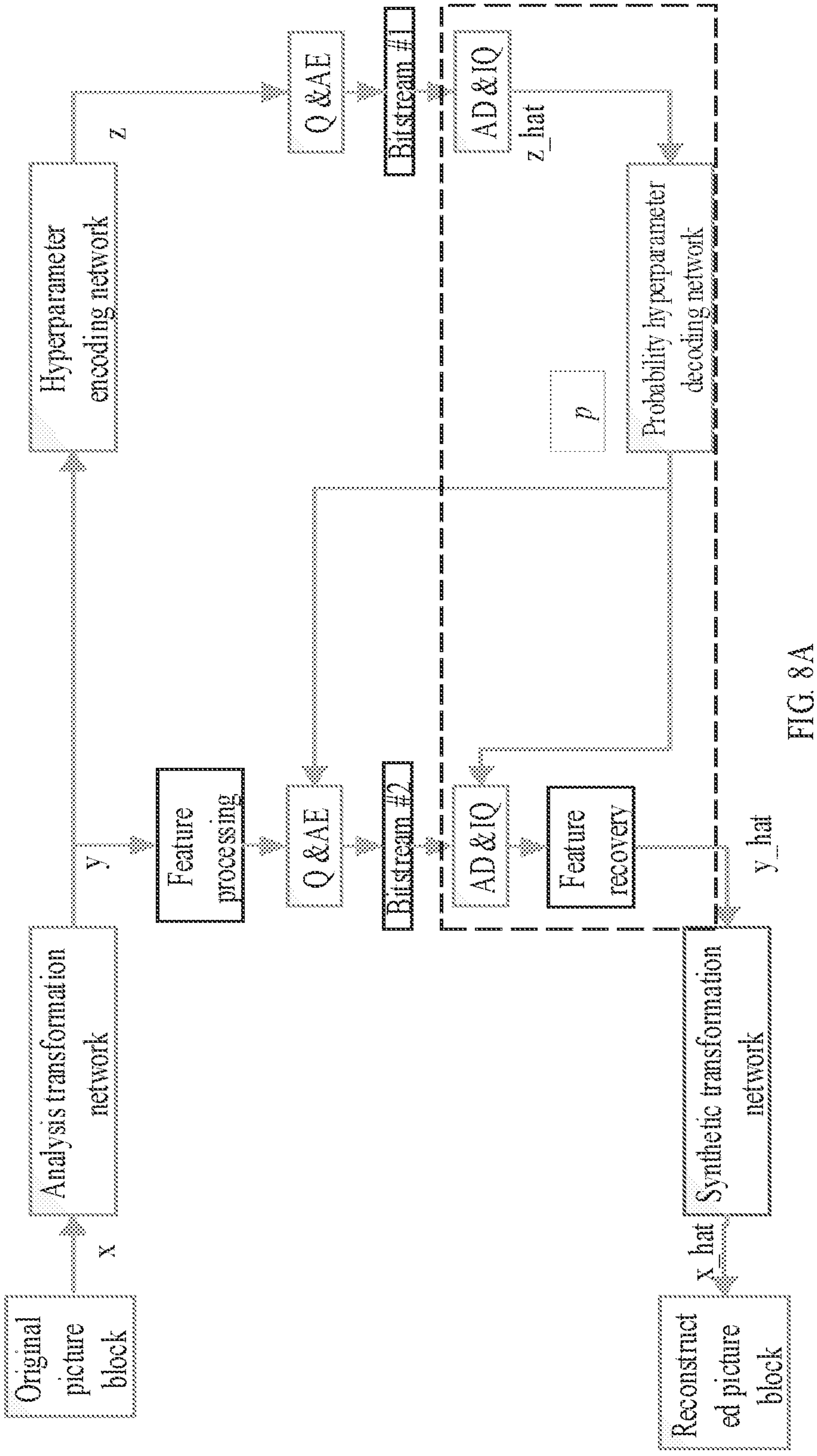
FIGS. 8A and 8B are schematic structural diagrams of decoding subnetworks according to embodiments of the present disclosure.

For example, the first neural network can be a decoding subnetwork. Taking the decoding subnetwork as an example, as shown in FIG. 8A, the network within the dashed box is the decoding subnetwork, and y_hat is the first feature output by the decoding subnetwork.

For example, after obtaining the corresponding Bitstream #1 for the current picture block, the encoding or decoding end can decode Bitstream #1 to obtain the hyperparameter quantization feature, and perform inverse quantization on the hyperparameter quantization feature, to obtain the coefficient hyperparameter feature z_hat. Alternatively, after obtaining the Bitstream #1 corresponding to the current picture block, the encoding or decoding end can also decode Bitstream #1 to obtain the coefficient hyperparameter feature z_hat, without involving the inverse quantization process of the coefficient hyperparameter feature z_hat.

After obtaining the coefficient hyperparameter feature z_hat, the encoding or decoding end can perform coefficient hyperparameter feature inverse transformation on the coefficient hyperparameter feature z_hat, to obtain the probability distribution parameter p. For example, the coefficient hyperparameter feature z_hat is input to the probability hyperparameter decoding network, where the probability hyperparameter decoding network performs coefficient hyperparameter feature inverse transformation on the coefficient hyperparameter feature z_hat to obtain the probability distribution parameter p. After the probability distribution parameter p is obtained, a probability distribution model can be generated based on the probability distribution parameter p.

After obtaining the Bitstream #2 corresponding to the current picture block, the encoding or decoding end can also decode Bitstream #2 to obtain a picture quantized feature, and perform inverse quantization on the picture quantized feature to obtain picture feature s'. Alternatively, after obtaining the Bitstream #2 corresponding to the current picture block, the encoding or decoding end can also decode the Bitstream #2 to obtain the picture feature s', without involving the inverse quantization process of the picture quantized feature. For example, w % ben decoding Bitstream #2, the encoding or decoding end can decode Bitstream #2 based on the probability distribution model.

After obtaining the picture feature s', the encoding or decoding end can perform feature recovery on the picture feature s' to obtain the picture feature y_hat, where the picture feature y_hat can be used as the first feature, that is, the decoding subnetwork outputs the first feature y_hat.

Embodiment 9: for Embodiments 1 to 7, for the encoding and decoding ends, the first neural network can be used to obtain the first feature corresponding to the current picture block. For example, based on the first bitstream corresponding to the current picture block, a probability distribution parameter and a predicted value (such as a mean) can be obtained; the probability distribution model can be determined based on probability distribution parameter, and the second bitstream corresponding to the current picture block is decoded based on the probability distribution model to obtain the decoded picture feature; residual recovery is performed on the decoded picture feature to obtain residual feature; and based on the residual feature and the predicted value, the first feature corresponding to the current picture block is determined.

Figure 8B:
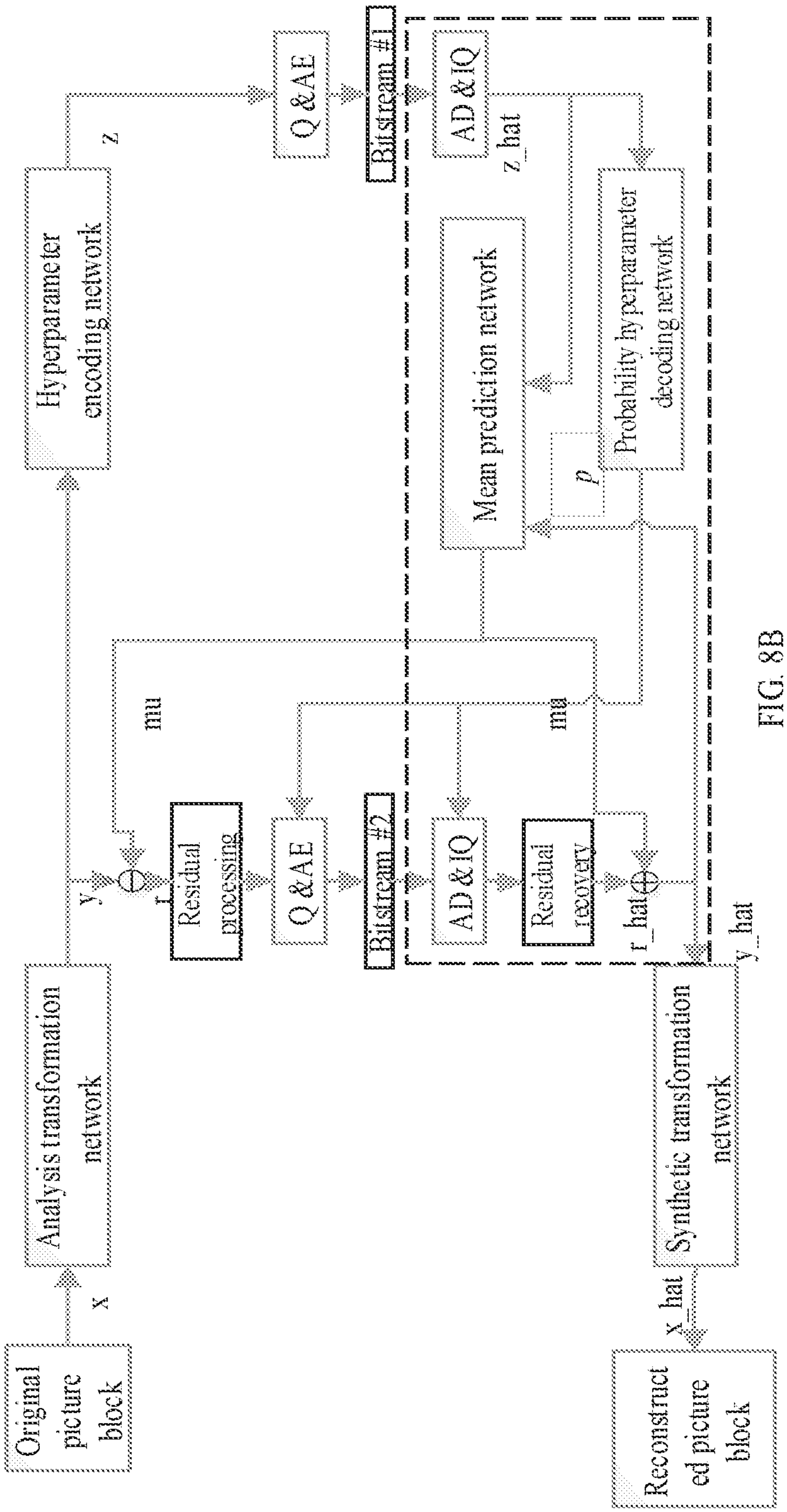

For example, the first neural network can be a decoding subnetwork. Taking the decoding subnetwork as an example, as shown in FIG. 8B, the network within the dashed box is the decoding subnetwork, and y_hat is the first feature output by the decoding subnetwork.

For example, after obtaining the corresponding Bitstream #1 for the current picture block, the encoding or decoding end can decode Bitstream #1 to obtain the hyperparameter quantization feature, and perform inverse quantization on the hyperparameter quantization feature, to obtain the coefficient hyperparameter feature z_hat. Alternatively, after obtaining the Bitstream #1 corresponding to the current picture block, the encoding or decoding end can also decode Bitstream #1 to obtain the coefficient hyperparameter feature z_hat, without involving the inverse quantization process of the coefficient hyperparameter feature z_hat.

After obtaining the coefficient hyperparameter feature z-hat, the encoding or decoding end can perform coefficient hyperparameter feature inverse transformation on the coefficient hyperparameter feature z-hat, to obtain the probability distribution parameter p. For example, the coefficient hyperparameter feature z-hat is input to the probability hyperparameter decoding network, where the probability hyperparameter decoding network performs coefficient hyperparameter feature inverse transformation on the coefficient hyperparameter feature z-hat to obtain the probability distribution parameter p. After the probability distribution parameter p is obtained, a probability distribution model can be generated based on the probability distribution parameter p.

After obtaining the coefficient hyperparameter feature z_hat, the encoding or decoding end can perform context-based prediction based on the coefficient hyperparameter feature z_hat of the current picture block and the residual feature y_hat of the previous picture block, to obtain the predicted value mu (i.e., mean mu) corresponding to the current picture block. For example, the coefficient hyperparameter feature z_hat and residual feature y_hat are input to the mean prediction network, and the mean prediction network determines the predicted value mu based on the coefficient hyperparameter feature z_hat and residual feature y_hat. This prediction process is not limited. Where for the context-based prediction process, the input of the mean prediction network can include the coefficient hyperparameter feature z_hat and the decoded residual feature y_hat, where the initial coefficient hyperparameter feature z_hat and the decoded residual feature y_hat are jointly input to obtain a more accurate predicted value mu.

After obtaining the Bitstream #2 corresponding to the current picture block, the encoding or decoding end can also decode Bitstream #2 to obtain a picture quantized feature, and perform inverse quantization on the picture quantized feature to obtain picture feature s'. Alternatively, after obtaining the Bitstream #2 corresponding to the current picture block, the encoding or decoding end can also decode the Bitstream #2 to obtain the picture feature s', without involving the inverse quantization process of the picture quantized feature. For example, w % ben decoding Bitstream #2, the encoding or decoding end can decode Bitstream #2 based on the probability distribution model.

After obtaining the picture feature s', the encoding or decoding end performs feature recovery (i.e., residual recovery, which is the inverse process of residual processing) on the picture feature s' to obtain the residual feature r_hat. After obtaining the residual feature r_hat, the encoding or decoding end determines the picture feature y_hat based on the residual feature r_hat and the predicted value mu. For example, the sum of the residual feature r_hat and the predicted value mu is taken as the picture feature y_hat, and the picture feature y_hat can be used as the first feature, that is, the decoding subnetwork outputs the first feature y_hat.

For example, compared to FIG. 8A, in the decoding subnetwork of FIG. 8B, in addition to obtaining the probability distribution parameter for the second bitstream based on the first bitstream, a prediction value mu for the first feature can further be generated based on the first bitstream. Based on the decoding of the second bitstream, the feature residual is obtained, and then residual recovery is performed to obtain the residual r_hat of the first feature. The first feature can be obtained based on mu and r_hat.

Embodiment 10: for Embodiments 1 to 9, for the encoding and decoding ends, after obtaining the first feature y_hat, the first feature y_hat can be synthesized and transformed through a synthesis transformation network to obtain the reconstructed picture block x_hat corresponding to the current picture block x. During the synthesis transformation process, the first feature y_hat can be enhanced to obtain the second feature; the second feature can be adjusted based on the feature adjustment factor to obtain the third feature; and after obtaining the third feature, the target feature can be determined based on the third feature. Then, based on the target feature, the reconstructed picture block x_hat corresponding to the current picture block x is obtained.

As shown in FIG. 6B, which is a schematic structural diagram of the synthetic transformation network, the synthetic transformation network can sequentially include a ResBlock layer (i.e., RB layer), a ResBlock layer, a Conv layer, a Cropping layer, a ResAU layer, a Conv layer, a Cropping layer, a ResAU layer, a Conv layer, an RNAB layer, a Cropping layer, a ResAU layer, a Conv layer, and a Cropping layer. The schematic diagram of the RB layer can be seen in FIG. 6E, and the schematic diagram of the ResAU layer can be seen in FIG. 6C.

Figure 6H:
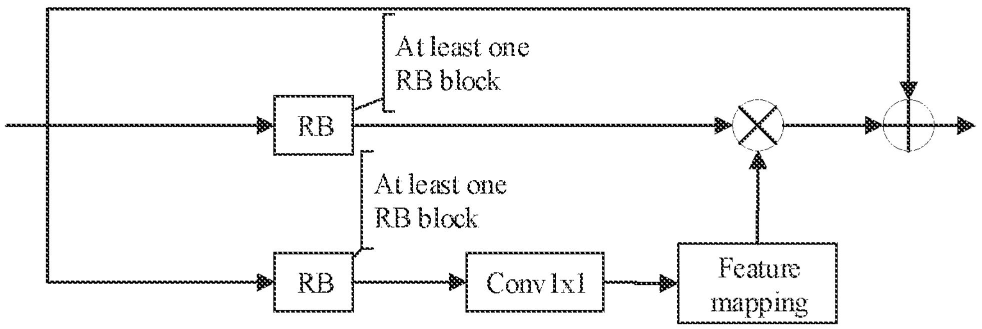

The RNAB layer is a residual non-local attention block. The schematic structural diagram of the RNAB layer can be seen in FIG. 6D, or part of the network layer in FIG. 6D can be removed to obtain the optimized RNAB layer. As shown in FIG. 6F, three RB layers and two Conv layers can be removed to obtain the optimized RNAB layer. Therefore, the schematic structural diagram of the RNAB layer can be seen in FIG. 6G, or the schematic structural diagram of the RNAB layer can be seen in FIG. 6H. In FIGS. 6G and 6H, the RNAB layer may include an RB layer (composed of at least one RB block, such as composed of three consecutive RB blocks), an RB layer (composed of at least one RB block, such as composed of three consecutive RB blocks), one Conv layer, and one sigmoid layer (i.e., feature mapping layer). The Conv layers can be a 3*3 Conv layer, a 5*5 Conv layer, a 1*1 Conv layer, or other sizes of Conv layers, such as a 7*7 Conv layer or a 9*9 Conv layer. There is no limitation on the size of the Conv layer.

The above synthetic transformation network can be divided into a feature enhancement subnetwork and a reconstruction decoding subnetwork. The feature enhancement subnetwork can include an initial enhancement subnetwork, a first upsampling convolutional subnetwork, and an attention subnetwork. The reconstruction decoding subnetwork may include a second upsampling convolutional subnetwork and a color space transformation subnetwork.

For example, all networks before the RNAB layer in the synthetic transformation network can be used as the initial enhancement subnetwork and the first upsampling convolutional subnetwork. The initial enhancement subnetwork can include 2 RB networks, and the first upsampling convolutional subnetwork can include at least one upsampling convolutional network (such as 3 upsampling convolutional networks). For example, as shown in FIG. 6B, all networks before the RNAB layer are sequentially RB layer, RB layer, Conv layer, Cropping layer, ResAU layer, Conv layer, Cropping layer, ResAU layer, and Conv layer. Based on this, the initial enhancement subnetwork can include RB layer and RB layer, and the first upsampling convolutional subnetwork can include Conv layer, Cropping layer, ResAU layer, Conv layer, Cropping layer, ResAU layer, and Conv layer, involving three upsampling convolutional networks (Conv layers). 3*3 Conv layers are taken as an example herein.

For example, the RNAB layer in a synthetic transformation network can be used as an attention subnetwork. The attention subnetwork can effectively reduce complexity by removing the up and down sampling convolutional network, as shown in FIG. 6G and FIG. 6H, which illustrate the structure of the attention subnetwork. The attention subnetwork can include an RB layer (composed of at least one RB block), an RB layer (composed of at least one RB block), one Conv layer, and one sigmoid layer (i.e., a feature mapping layer).

The attention subnetwork can include residual skip subnetwork, a residual enhancement subnetwork, and a weight generation subnetwork. For the residual skip subnetwork, x_out0=x_in, where x_in is the input feature of the residual skip subnetwork and x_out0 is the output feature of the residual skip subnetwork. For the residual enhancement subnetwork, x_out1=RB (x_in), where x_in is the input feature of the residual enhancement subnetwork and x_out1 is the output feature of the residual enhancement subnetwork. The weight generation subnetwork is configured to obtain the weight feature k of the output feature x_out1 of the residual enhancement subnetwork. Therefore, the final output of the attention subnetwork is; x_out=x_in+k*x_out1.

Figure 9A:
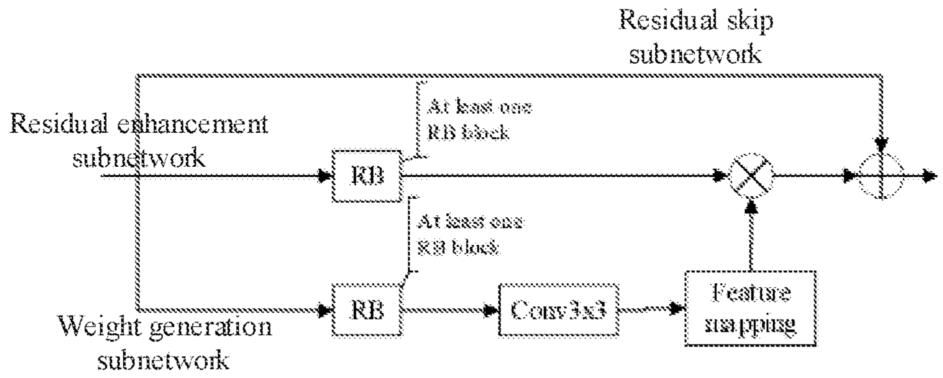
FIGS. 9A and 9B are schematic structural diagrams of attention subnetwork according to embodiments of the present disclosure.
Figure 9B:
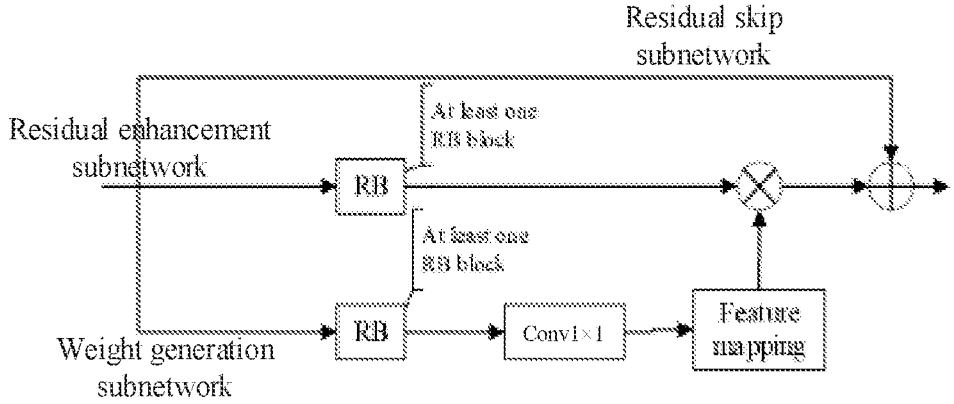

As shown in FIGS. 9A and 9B, the residual skip subnetwork is configured to add the input feature x_in (i.e., x_out0) to the final output feature of the attention subnetwork. The residual enhancement subnetwork includes at least one RB block (such as one RB block or three RB blocks, etc.), and is configured to process the input feature x_in based on the RB block(s) to obtain the output feature x_out1. The weight generation subnetwork can include at least one RB block (such as one RB block or three RB blocks, etc.), one Conv layer (such as a 3*3 Conv layer, a 5*5 Conv layer, or a 1*1 Conv layer, etc.), and a feature mapping layer (such as using sigmoid processing to implement feature mapping). The weight generation subnetwork is configured to process the input feature x_in based on the RB block, then convolute the RB block processed feature by the Conv layer, and then use the feature mapping layer to map the Conv layer processed feature to obtain the weight feature k. The dimension of the weight feature k is the same as the dimension of the output feature x_out1 of the residual enhancement subnetwork. The output feature x_out1 is multiplied with the weight feature k, and then added to the output feature x_out0 of the residual skip subnetwork, and the final output feature of the attention subnetwork is obtained as x_out=x_in+k*x_out1.

For example, all networks after the RNAB layer in the synthetic transformation network can be used as the reconstruction decoding subnetwork, where the reconstruction decoding subnetwork can include a second upsampling convolutional subnetwork and a color space transformation subnetwork. That is, all networks after the RNAB layer can be used as the second upsampling convolutional subnetwork and the color space transformation subnetwork. The second upsampling convolutional subnetwork can include at least one upsampling convolutional network (such as one upsampling convolutional network), and the color space transformation subnetwork is configured to implement the picture transformation from YUV domain to RBG, or the filtering process from YUV domain to YUV domain.

For example, as shown in FIG. 6B, all networks after the RNAB layer are sequentially Cropping layer, ResAU layer, Conv layer, and Cropping layer. Therefore, the second upsampling convolutional subnetwork can include Cropping layer, ResAU layer, Conv layer, and Cropping layer, which involves one upsampling convolutional network (Conv layer), where a 3*3 Conv layer is taken as an example. If there is a need for color space transformation, a color space transformation subnetwork (not shown in FIG. 6B) can be included, where the color space transformation subnetwork performs the picture transformation from YUV domain to RBG, or performs the filtering process from YUV domain to YUV domain. If there is no need for color space transformation, the color space transformation subnetwork can be excluded.

After the synthetic transformation network is divided into an initial enhancement subnetwork, a first upsampling convolutional subnetwork, an attention subnetwork, and a reconstruction decoding subnetwork (where the reconstruction decoding subnetwork includes a second upsampling convolutional subnetwork and a color space transformation subnetwork), the first feature y_hat can be synthesized and transformed based on the initial enhancement subnetwork, the first upsampling convolutional subnetwork, the attention subnetwork, and the reconstruction decoding subnetwork to obtain the reconstructed picture block x_hat corresponding to the current picture block x.

Embodiment 11: in Embodiment 10, the first feature y_hat can be synthesized and transformed based on the initial enhancement subnetwork, first upsampling convolutional subnetwork, attention subnetwork, and reconstruction decoding subnetwork to obtain the reconstructed picture block x_hat corresponding to the current picture block x. In an embodiment, a feature adjustment factor can be used to adjust the output feature of the feature enhancement subnetwork. The adjustment position of the feature adjustment factor can be shown in FIG. 10A. Under the adjustment method of this feature adjustment factor, the first feature y_hat can be synthesized and transformed in the following way to obtain the reconstructed picture block x_hat.

Feature enhancement is performed on the first feature y_hat by an initial enhancement subnetwork, to obtain an enhanced feature. For example, the first feature y_hat can be input into an initial enhancement subnetwork, where the initial enhancement subnetwork performs feature enhancement on the first feature y_hat to obtain the enhanced feature. For example, the initial enhancement subnetwork can include an RB layer and an RB layer. Therefore, feature enhancement can be performed on the first feature y_hat by two RB layers to obtain the enhanced feature, and this process is not limited.

After the enhanced feature is obtained, the first upsampling convolutional subnetwork is configured to upsample and convolute the enhanced feature, to obtain an initial feature corresponding to the attention subnetwork, i.e., the input features x_in corresponding to the attention subnetwork. For example, the enhanced feature (i.e., the output feature of the initial enhancement subnetwork) can be input to the first upsampling convolutional subnetwork, where the first upsampling convolutional subnetwork performs upsampling convolution on the enhanced feature to obtain the initial feature corresponding to the attention subnetwork. For example, the first upsampling convolutional subnetwork can include Conv layer, Cropping layer, ResAU layer, Conv layer, Cropping layer, ResAU layer, and Conv layer. These network layers can be used to upsample and convolute the enhanced feature without any limitation on this process.

After the initial feature x_in corresponding to the attention subnetwork is obtained, the attention subnetwork can be configured to performing feature enhancement on the initial feature x_in to obtain the second feature. For example, the initial feature x_in can be input separately into the residual skip subnetwork, the residual enhancement subnetwork, and the weight generation subnetwork. After obtaining the initial feature x_in, the residual skip subnetwork adds the initial feature x_in (i.e., x_out0) to the final output feature of the attention subnetwork. After obtaining the initial feature x_in, the residual enhancement subnetwork enhances the initial feature x_in to obtain the enhanced feature. For example, the residual enhancement subnetwork enhances the initial feature x_in based on the RB block to obtain the enhanced feature x_out1. After obtaining the initial feature x_in, the weight generation subnetwork generates the weight feature corresponding to the initial feature x_in, i.e., the weight feature k of the output feature x_out1 of the residual enhancement subnetwork.

Figure 10A:
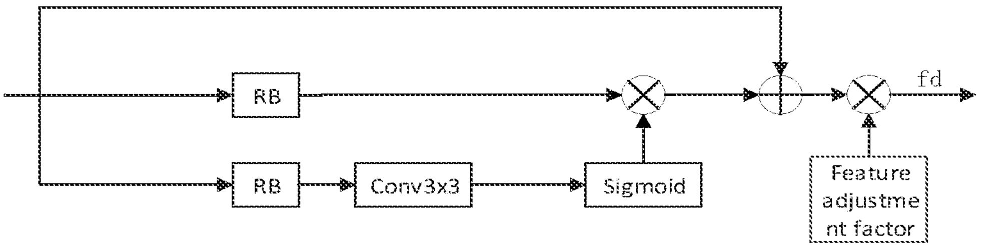
FIGS. 10A-10C are schematic diagrams of adjustment positions of feature adjustment factor according to embodiments of the present disclosure.

For example, the weight generation subnetwork can include a residual block subnetwork, a convolutional subnetwork, and a feature mapping subnetwork. The residual block subnetwork can be configured to convolute and activate the initial feature x_in to obtain the convoluted activated feature. The convolutional subnetwork can be configured to convolute the convoluted activated feature to obtain the convoluted feature. The feature mapping subnetwork can be configured to perform feature mapping on the convoluted feature to obtain the weight feature k. As shown in FIG. 10A, the weight generation subnetwork can include at least one RB block (such as one RB block or three RB blocks, i.e., residual block subnetwork), one Conv layer (such as a 3*3 Conv layer, a 5*5 Conv layer, or a 1*1 Conv layer, i.e., convolutional subnetwork), and a feature mapping layer (such as using sigmoid processing to implement feature mapping, i.e., feature mapping subnetwork). Based on this, the initial feature x_in can be convoluted and activated based on the RB block to obtain the convoluted activated feature. Then, the Conv layer can be used to convolute the convoluted activated feature to obtain the convoluted feature. Finally, the feature mapping layer can be used to perform feature mapping on the convoluted feature to obtain the weight feature k.

As shown in FIG. 10A, after the enhanced feature x_out1, weight feature k, and initial feature x_in (i.e., x_out0) are obtained, a second feature can be generated based on the initial feature x_in, enhanced feature x_out1, and weight feature k. The second feature can be the final output feature of the attention subnetwork. For example, after the enhanced feature x_out1 is multiplied with the weight feature k, and then added to the output feature x_out0 of the residual skip subnetwork. That is, the second feature is: x_out=x_in+k*x_out1.

After the second feature is obtained, the second feature can be adjusted based on the feature adjustment factor, and the adjusted feature is used as the third feature. After the third feature is obtained, the third feature can be determined as the target feature.

After the target feature is obtained, the target feature can be processed by the reconstruction decoding subnetwork to obtain the reconstructed picture block x_hat corresponding to the current picture block x. For example, the target feature can be input into the reconstruction decoding subnetwork, where the reconstruction decoding subnetwork processes the target feature to obtain the reconstructed picture block x_hat corresponding to the current picture block x. For example, the reconstruction decoding subnetwork may include a second upsampling convolutional subnetwork, where the second upsampling convolutional subnetwork can perform upsampling convolution on the target feature to obtain the reconstructed picture block x_hat corresponding to the current picture block x. Alternatively, the reconstruction decoding subnetwork may include a second upsampling convolutional subnetwork and a color space transformation subnetwork. The target feature can be upsampled and convoluted by the second upsampling convolutional subnetwork, and the upsampled and convoluted feature can be color space transformed by the color space transformation subnetwork to obtain the reconstructed picture block x_hat corresponding to the current picture block x. For example, the second upsampling convolutional subnetwork can include a Cropping layer, ResAU layer, Conv layer, and Cropping layer, where these network lavers can be used to upsample and convolute the target feature without any limitation on this process. The color space transformation subnetwork is used for the picture transformation from YUV domain to RBG, or for the filtering process from YUV domain to YUV domain, and this process is not limited.

Embodiment 12: in Embodiment 10, the first feature y_hat can be synthesized and transformed based on the initial enhancement subnetwork, first upsampling convolutional subnetwork, attention subnetwork, and reconstruction decoding subnetwork to obtain the reconstructed picture block x_hat corresponding to the current picture block x. In an embodiment, a feature adjustment factor can be used to adjust the residual enhanced output feature of the attention subnetwork. The adjustment position of the feature adjustment factor can be shown in FIG. 10B. Under the adjustment method of this feature adjustment factor, the first feature y_hat can be synthesized and transformed in the following way to obtain the reconstructed picture block x_hat.

Feature enhancement is performed on the first feature y_hat by an initial enhancement subnetwork, to obtain an enhanced feature. For example, the first feature y_hat can be input into an initial enhancement subnetwork, where the initial enhancement subnetwork performs feature enhancement on the first feature y_hat to obtain the enhanced feature. For example, the initial enhancement subnetwork can include an RB layer and an RB layer. Therefore, feature enhancement can be performed on the first feature y_hat by two RB layers to obtain the enhanced feature, and this process is not limited.

After the enhanced feature is obtained, the first upsampling convolutional subnetwork is configured to upsample and convolute the enhanced feature, to obtain an initial feature corresponding to the attention subnetwork, i.e., the input features x_in corresponding to the attention subnetwork. For example, the enhanced feature (i.e., the output feature of the initial enhancement subnetwork) can be input to the first upsampling convolutional subnetwork, where the first upsampling convolutional subnetwork performs upsampling convolution on the enhanced feature to obtain the initial feature corresponding to the attention subnetwork. For example, the first upsampling convolutional subnetwork can include Conv layer, Cropping layer, ResAU layer, Conv layer, Cropping layer, ResAU layer, and Conv layer. These network layers can be used to upsample and convolute the enhanced feature without any limitation on this process.

After the initial feature x_in corresponding to the attention subnetwork is obtained, the initial feature x_in can be input separately into the residual skip subnetwork, the residual enhancement subnetwork, and the weight generation subnetwork. After obtaining the initial feature x_in, the residual skip subnetwork adds the initial feature x_in (i.e., x_out0) to the final output feature of the attention subnetwork. After obtaining the initial feature x_in, the residual enhancement subnetwork enhances the initial feature x_in to obtain the enhanced feature. For example, the residual enhancement subnetwork enhances the initial feature x_in based on the RB block to obtain the enhanced feature x_out1. After obtaining the initial feature x_in, the weight generation subnetwork generates the weight feature corresponding to the initial feature x_in, i.e., the weight feature k of the output feature x_out1 of the residual enhancement subnetwork.

Figure 10B:
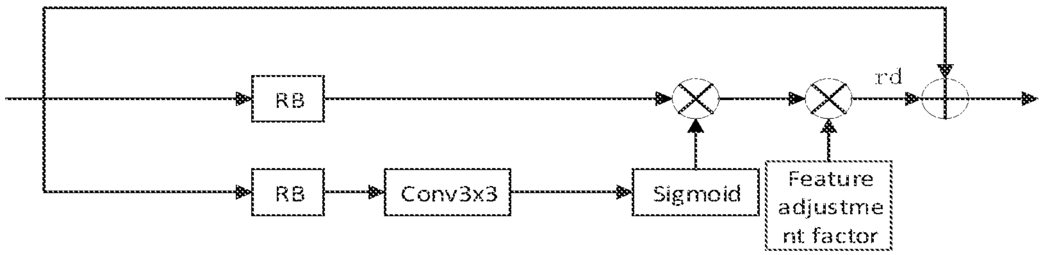

For example, the weight generation subnetwork includes a residual block subnetwork, a convolutional subnetwork, and a feature mapping subnetwork. The residual block subnetwork can be configured to convolute and activate the initial feature x_in to obtain the convoluted activated feature. The convolutional subnetwork can be configured to convolute the convoluted activated feature to obtain the convoluted feature. The feature mapping subnetwork can be configured to perform feature mapping on the convoluted feature to obtain the weight feature k. As shown in FIG. 10B, the weight generation subnetwork includes at least one RB block (i.e., residual block subnetwork), one Conv layer (i.e., convolutional subnetwork), and a feature mapping layer (i.e., feature mapping subnetwork). Based on this, the initial feature x_in is convoluted and activated based on the RB block to obtain the convoluted activated feature. The Conv layer is configured to convolute the convoluted activated feature to obtain the convoluted feature, and the feature mapping layer is configured to perform feature mapping on the convoluted feature to obtain the weight feature k.

As shown in FIG. 10B, after obtaining the enhanced feature x_out1 and the weight feature k, a second feature can be generated based on the enhanced feature x_out1 and the weight feature k. For example, the enhanced feature x_out1 can be multiplied with the weight feature k, and the multiplied feature can be used as the second feature. That is, the second feature can be k*x_out1.

After the second feature is obtained, the second feature can be adjusted based on the feature adjustment factor, and the adjusted feature can be used as the third feature. As shown in FIG. 10B, the third feature can be feature rd.

After the third feature rd is obtained, a fourth feature can be generated based on the initial feature x_in (i.e., the output feature x_out0 of the residual skip subnetwork) and the third feature rd, where the fourth feature can be the final output feature of the attention subnetwork. For example, the third feature rd is added to the output feature x_out0 of the residual skip subnetwork to obtain the fourth feature x_out=x_in+rd.

From the above, it can be seen that the first subnetwork (such as the residual enhancement subnetwork and the weight generation subnetwork, where the weight generation subnetwork can include a residual block subnetwork, a convolutional subnetwork, and a feature mapping subnetwork) of the attention subnetwork can be used to performing feature enhancement on the initial feature x_in to obtain the second feature. After the second feature is obtained, the second feature can be adjusted based on the feature adjustment factor to obtain the third feature rd. After the third feature rd is obtained, the third feature rd can be processed by the second subnetwork (such as the residual skip subnetwork) of the attention subnetwork to obtain the fourth feature x_out. After the fourth feature x_out is obtained, the fourth feature x_out can be determined as the target feature.

After the target feature is obtained, the target feature can be processed by the reconstruction decoding subnetwork to obtain the reconstructed picture block x_hat corresponding to the current picture block x. For example, the target feature can be input into the reconstruction decoding subnetwork, where the reconstruction decoding subnetwork processes the target feature to obtain the reconstructed picture block x_hat corresponding to the current picture block x. For example, the reconstruction decoding subnetwork may include a second upsampling convolutional subnetwork, where the second upsampling convolutional subnetwork can perform upsampling convolution on the target feature to obtain the reconstructed picture block x_hat corresponding to the current picture block x. Alternatively, the reconstruction decoding subnetwork may include a second upsampling convolutional subnetwork and a color space transformation subnetwork. The target feature can be upsampled and convoluted by the second upsampling convolutional subnetwork, and the upsampled and convoluted feature can be color space transformed by the color space transformation subnetwork to obtain the reconstructed picture block x_hat corresponding to the current picture block x. For example, the second upsampling convolutional subnetwork can include a Cropping layer, ResAU laver, Conv layer, and Cropping layer, where these network layers can be used to upsample and convolute the target feature without any limitation on this process. The color space transformation subnetwork is used for the picture transformation from YUV domain to RBG, or for the filtering process from YUV domain to YUV domain, and this process is not limited.

Embodiment 13: in Embodiment 10, the first feature y_hat can be synthesized and transformed based on the initial enhancement subnetwork, first upsampling convolutional subnetwork, attention subnetwork, and reconstruction decoding subnetwork to obtain the reconstructed picture block x_hat corresponding to the current picture block x. In an embodiment, a feature adjustment factor can be used to adjust the weight output feature of the attention subnetwork. The adjustment position of the feature adjustment factor can be shown in FIG. 10C. Under the adjustment method of this feature adjustment factor, the first feature y_hat can be synthesized and transformed in the following way to obtain the reconstructed picture block x_hat.

Feature enhancement is performed on the first feature y_hat by an initial enhancement subnetwork, to obtain an enhanced feature. For example, the first feature y_hat can be input into an initial enhancement subnetwork, where the initial enhancement subnetwork performs feature enhancement on the first feature y_hat to obtain the enhanced feature. For example, the initial enhancement subnetwork can include an RB layer and an RB layer. Therefore, feature enhancement can be performed on the first feature y_hat by two RB layers to obtain the enhanced feature, and this process is not limited.

After the enhanced feature is obtained, the first upsampling convolutional subnetwork is configured to upsample and convolute the enhanced feature, to obtain an initial feature corresponding to the attention subnetwork, i.e., the input features x_in corresponding to the attention subnetwork. For example, the enhanced feature (i.e., the output feature of the initial enhancement subnetwork) can be input to the first upsampling convolutional subnetwork, where the first upsampling convolutional subnetwork performs upsampling convolution on the enhanced feature to obtain the initial feature corresponding to the attention subnetwork. For example, the first upsampling convolutional subnetwork can include Conv layer, Cropping layer, ResAU layer, Conv layer, Cropping layer, ResAU layer, and Conv layer. These network layers can be used to upsample and convolute the enhanced feature without any limitation on this process.

After the initial feature x_in corresponding to the attention subnetwork is obtained, the initial feature x_in can be input separately into the residual skip subnetwork, the residual enhancement subnetwork, and the weight generation subnetwork. For example, after obtaining the initial feature x_in, the residual skip subnetwork adds the initial feature x_in (i.e., x_out0) to the final output feature of the attention subnetwork. After obtaining the initial feature x_in, the residual enhancement subnetwork enhances the initial feature x_in to obtain the enhanced feature. For example, the residual enhancement subnetwork enhances the initial feature x_in based on the RB block to obtain the enhanced feature x_out1.

Figure 10C:
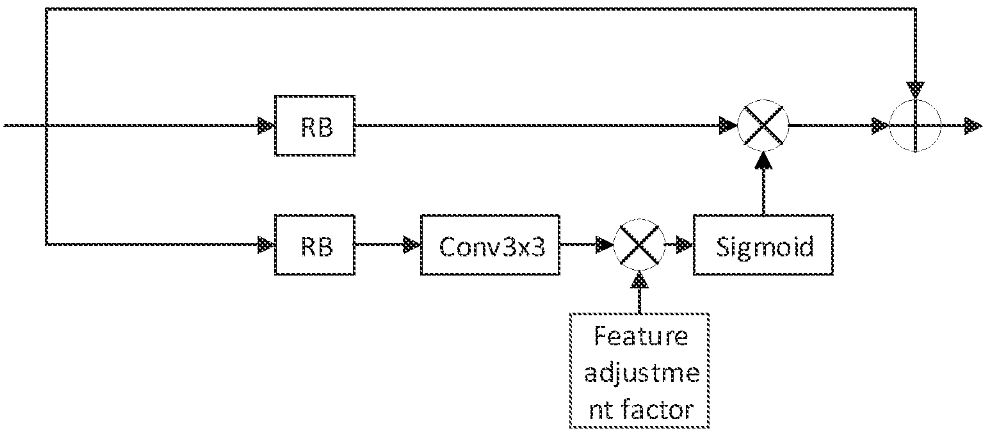

The weight generation subnetwork can include a residual block subnetwork, a convolutional subnetwork, and a feature mapping subnetwork. As shown in FIG. 10C, the weight generation subnetwork can include at least one RB block (i.e., the residual block subnetwork), one Conv layer (i.e., the convolutional subnetwork), and a feature mapping layer (i.e., the feature mapping subnetwork). Based on this, the initial feature x_in can be input to the residual block subnetwork, and the residual block subnetwork can be used to convolute and activate the initial feature x_in to obtain the convoluted activated feature. For example, the residual block subnetwork convolutes and activates the initial feature x_in based on the RB block to obtain the convoluted activated feature.

Then, the convolutional subnetwork can be used to convolute the convoluted activated feature to obtain the convoluted feature. For example, the convolutional subnetwork can use the Conv layer to convolute the convoluted activated feature to obtain the convoluted feature. After the convoluted feature is obtained, the second feature can be determined based on the convoluted feature. For example, the convoluted feature can be used as the second feature.

In summary, the residual block subnetwork can be used to performing feature enhancement on the initial feature x_in to obtain the enhanced feature. The convolutional subnetwork can then be used to convolute the enhanced feature to obtain the second feature. After the second feature is obtained, the second feature can be adjusted based on the feature adjustment factor, and the adjusted feature is used as the third feature.

As shown in FIG. 10C, after the third feature is obtained, a feature mapping subnetwork can be used to performing feature mapping on the third feature to obtain the weight feature k. After the enhanced feature x_out1, weight feature k, and initial feature x_in (i.e., x_out0) are obtained, a fourth feature can be generated based on the initial feature x_in, enhanced feature x_out1, and weight feature k. The fourth feature can be the final output feature of the attention subnetwork. For example, after the enhanced feature x_out1 is multiplied with the weight feature k, and then added to the output feature x_out0 of the residual skip subnetwork. That is, the fourth feature is: x_out=x_in+k*x_out1.

From the above, it can be seen that the first subnetwork (such as the residual block subnetwork and convolutional subnetwork in the weight regeneration subnetwork) of the attention subnetwork can be used to performing feature enhancement on the initial feature x_in to obtain the second feature. After the second feature is obtained, the second feature can be adjusted based on the feature adjustment factor to obtain the third feature. After obtaining the third feature, the second subnetwork (such as residual skip subnetwork, residual enhancement subnetwork, and feature mapping subnetwork in the weight generation subnetwork) of the attention subnetwork can be used to process the third feature and obtain the fourth feature x_out. For example, the feature mapping subnetwork is configured to perform feature mapping on the third feature to obtain the weight feature k; the residual enhancement subnetwork is configured to perform feature enhancement on the initial feature x_in to obtain the enhanced feature x_out1; and the fourth feature x_out is generated based on the initial feature x_in, the enhanced feature x_out1, and the weight feature k. After the fourth feature x_out is obtained, the fourth feature x_out can be determined as the target feature.

After the target feature is obtained, the target feature can be processed by the reconstruction decoding subnetwork to obtain the reconstructed picture block x_hat corresponding to the current picture block x. For example, the target feature can be input into the reconstruction decoding subnetwork, where the reconstruction decoding subnetwork processes the target feature to obtain the reconstructed picture block x_hat corresponding to the current picture block x. For example, the reconstruction decoding subnetwork may include a second upsampling convolutional subnetwork, where the second upsampling convolutional subnetwork can perform upsampling convolution on the target feature to obtain the reconstructed picture block x_hat corresponding to the current picture block x. Alternatively, the reconstruction decoding subnetwork may include a second upsampling convolutional subnetwork and a color space transformation subnetwork. The target feature can be upsampled and convoluted by the second upsampling convolutional subnetwork, and the upsampled and convoluted feature can be color space transformed by the color space transformation subnetwork to obtain the reconstructed picture block x_hat corresponding to the current picture block x. For example, the second upsampling convolutional subnetwork can include a Cropping layer, ResAU layer, Conv layer, and Cropping layer, where these network layers can be used to upsample and convolute the target feature without any limitation on this process. The color space transformation subnetwork is used for the picture transformation from YUV domain to RBG, or for the filtering process from YUV domain to YUV domain, and this process is not limited.

Embodiment 14: for Embodiments 1 to 13, for the encoding and decoding ends, the second feature can be adjusted based on the feature adjustment factor to obtain the third feature. For example, when the second feature includes C*H*W feature values, where C represents the number of channels, H represents the feature height, and W represents the feature width, the feature adjustment value corresponding to each feature value can be determined based on the feature adjustment factor. For each feature value, the feature value is adjusted based on the feature adjustment value corresponding to the feature value, to obtain the adjusted feature value corresponding to the feature value. A third feature is generated based on the adjusted feature value corresponding to each feature value.

For example, when the second feature includes C*H*W feature values, the feature adjustment value corresponding to each feature value of the second feature can be determined based on the feature adjustment factor. For this process, the following situations can be adopted.

Situation 1: the dimension of the feature adjustment factor is the same as the dimension of the second feature. That is, each feature value of the second feature has a different feature adjustment value. For example, when the feature adjustment factor includes C*H*W feature adjustment values, the feature adjustment values respectively corresponding to the C*H*W feature values can be determined based on the C*H*W feature adjustment values.

For example, for the feature value at the position of h*w of the c-th channel in the second feature, the feature adjustment value corresponding to that feature value can be: the feature adjustment value at the position of the h*w of the c-th channel in the feature adjustment factor.

Situation 2: the W and H dimensions of the feature adjustment factor are the same as the W and H dimensions of the second feature, but the C dimension of the feature adjustment factor is 1. That is, the feature value at the same position in each channel of the second feature corresponds to the same feature adjustment value. For example, when the feature adjustment factor includes H*W feature adjustment values, the feature adjustment values respectively corresponding to the C*H*W feature values can be determined based on the H*W feature adjustment values (i.e., the C dimension of the feature adjustment factor is 1).

For example, for the feature value at the position of h*w of the c-th channel (i.e., each channel in the second feature) in the second feature, the feature adjustment value corresponding to that feature value can be: the feature adjustment value at the position of the h*w in the feature adjustment factor.

Situation 3: the C dimension of the feature adjustment factor is the same as the C dimension of the second feature, but the W and H dimensions of the feature adjustment factor are both 1. That is, the W*H feature values of the same channel of the second feature correspond to the same feature adjustment value. For example, when the feature adjustment factor includes C feature adjustment values, the feature adjustment values respectively corresponding to C*H*W feature values can be determined based on the C feature adjustment values (i.e., the W and H dimensions of the feature adjustment factor are both 1).

For example, for all feature values (i.e., feature values at any position) of the c-th channel in the second feature, the feature adjustment values corresponding to the feature values can be the feature adjustment value of the c-th channel in the feature adjustment factor.

For example, after the feature adjustment value corresponding to each feature value is obtained, for each feature value, the feature value can be adjusted based on the feature adjustment value corresponding to the feature value, to obtain the adjusted feature value corresponding to the feature value.

For example, when the feature value only corresponds to one feature adjustment value, the adjusted feature value corresponding to the feature value can be determined by the following formula: yr=rf*y; where yr represents the adjusted feature value, rf represents the feature adjustment value, and y represents the feature value. For example, for a feature value y (c, w, h) at a spatial position of (w, h) in the c-th channel, after determining the feature adjustment value rf (c, w, h) corresponding to the feature value y (c, w, h), the adjusted feature value yr (c, w, h) corresponding to the feature value y (c, w, h) is: yr (c, w, h)=rf (c, w, h)*y (c, w, h).

When the feature value corresponds to N+1 feature adjustment values, where N is a positive integer, i.e., the feature value corresponds to at least two feature adjustment values, the adjusted feature value corresponding to that feature value can be determined by the following formula: yr=rf_0*$y^0$+rf_1*$y^1$+rf_2*$y^2$+ . . . +rf_N*$y^N$ where yr represents the adjusted feature value, rf_0, rf_1, rf_2, . . . , rf_N represent N+1 feature adjustment values, and v represents the feature value. For example, for a feature value y (c, w, h) at a spatial position of (w, h) in the c-th channel, after the feature adjustment value rf_i (c, w, h) corresponding to the feature value y (c, w, h) is determined, where i=0, 1, 2, . . . , N, the adjusted feature value yr (c, w, h) corresponding to the feature value y (c, w, h) is: yr(c, w, h)=rf_(c, w, h)*$y^0$(c, w, h)+rf_1(c, w, h)*$y^1$(c, w, h)+rf_2(c, w, h)*$y^2$(c, w, h)+ . . . +rf_N(c, w, h)*$y^N$(c, w, h). When N is 1, yr(c, w, h)=rf_0(c, w, h)+rf_1(c, w, h)*y(c, w, h). When N is 2, yr(c, w, h)=rf_0(c, w, h)+rf_1(c, w, h)*y(c, w, h)+rf_2(c, w, h)*$y^2$(c, w, h). Similarly, when N takes other values, its form is similar and will not be repeated here. In the above formula, $y^k$(c, w, h) represents the power k of y.

For example, after the adjusted feature value corresponding to each feature value is obtained, a third feature can be generated based on the adjusted feature value corresponding to each feature value. The third feature can include the adjusted feature value corresponding to each feature value.

Embodiment 15: for Embodiments 1 to 14, for the encoding end, it is also necessary to determine whether the feature adjustment mode is enabled for the current picture block. If the feature adjustment mode is enabled for the current picture block, the feature adjustment factor corresponding to the current picture block is obtained and encoded in the auxiliary bitstream corresponding to the current picture block. If the feature adjustment mode is not enabled for the current picture block, there is no need to obtain the feature adjustment factor corresponding to the current picture block, nor is there a need to encode the feature adjustment factor in the auxiliary bitstream corresponding to the current picture block. For the decoding end, it is also necessary to determine whether the feature adjustment mode is enabled for the current picture block. If the feature adjustment mode is enabled for the current picture block, the feature adjustment factor corresponding to the current picture block is decoded from the auxiliary bitstream corresponding to the current picture block, and the target feature is determined based on the first feature and the feature adjustment factor. If the feature adjustment mode is not enabled for the current picture block, there is no need to decode the feature adjustment factor corresponding to the current picture block from the auxiliary bitstream corresponding to the current picture block.

For example, to determine whether the feature adjustment mode is enabled for the current picture block, the following methods can be used.

Method 1: the encoding end encodes a feature adjustment flag in the bitstream, and the decoding end decodes the feature adjustment flag from the bitstream. The feature adjustment flag allows the current picture block to enable the feature adjustment mode, or prohibits the current picture block from enabling the feature adjustment mode. If the feature adjustment flag allows the feature adjustment mode to be enabled for the current picture block, the decoding end determines that the feature adjustment mode is enabled for the current picture block. Otherwise, if the feature adjustment flag prohibits the current picture block from enabling the feature adjustment mode, the decoding end determines that the feature adjustment mode is disabled for the current picture block. For example, if the feature adjustment flag is set to the first value, the feature adjustment flag allows the current picture block to enable the feature adjustment mode. If the feature adjustment flag is set to the second value, the feature adjustment flag prohibits the current picture block from enabling the feature adjustment mode.

For example, the feature adjustment flag can be a sequence level feature adjustment flag, which means that the feature adjustment flag corresponds to all picture blocks in a sequence; or the feature adjustment flag can be a picture level feature adjustment flag, which means that the feature adjustment flag corresponds to all picture blocks in a picture; or the feature adjustment flag can be a slice level feature adjustment flag, which means that the feature adjustment flag corresponds to all picture blocks in a slice, which is not limited.

Method 2: the encoding end encodes a first range of feature values in the bitstream, and the decoding end decodes the first range of feature values from the bitstream. Based on this, if the feature values (such as all feature values) of the second feature are within the first range, the decoding end determines to enable the feature adjustment mode for the current picture block. Otherwise, if the feature values (such as any feature value) of the second feature is not within the range of the first value, the decoding end determines that the feature adjustment mode is disabled for the current picture block. For example, after obtaining the second feature, the decoding end can determine whether the feature values of the second feature are within the first range.

For example, the first range can be the sequence level first range, which means that all picture blocks in a sequence correspond to the first range; or the first range can be the picture level first range, which means that all picture blocks in a picture correspond to the first range; or the first range can be the slice level first range, which means that all picture blocks in a slice correspond to the first range, which is not limited.

Method 3: the encoding end encodes the second range of feature change values in the bitstream, and the decoding end decodes the second range of feature change values from the bitstream. Based on this, if the feature change values (such as the feature change values corresponding to all feature values, that is, each feature value of the second feature corresponds to a feature change value) corresponding to the second feature is within the second range, the decoding end determines that the current picture block enables the feature adjustment mode. Otherwise, if the feature change values (such as any feature change value) corresponding to the second feature are not within the second range, the decoding end determines that the feature adjustment mode is disabled for the current picture block. For example, after obtaining the second feature, the decoding end can also determine the feature change values corresponding to the second feature, that is, determine the feature change value corresponding to each feature value in the second feature. The feature change values can represent the range of changes in the spatial domain or channel domain, that is, the changes in the second feature in the spatial domain or channel domain are determined. For example, the feature change values can include but is not limited to gradient values.

For example, the second range can be the sequence level second range, which means that all picture blocks in a sequence correspond to the second range; or the second range can be the picture level second range, which means that all picture blocks in a picture correspond to the second range; or the second range can be the slice level second range, which means that all picture blocks in a slice correspond to the second range, which is not limited.

Method 4: the encoding end encodes the feature adjustment flag and the first range in the bitstream, and the decoding end decodes the feature adjustment flag and the first range from the bitstream. If the feature adjustment flag allows the current picture block to enable feature adjustment mode, and the feature values (such as all feature values) of the second feature are within the first range, it is determined that the current picture block enables the feature adjustment mode. Otherwise, if the feature adjustment flag prohibits the current picture block from enabling the feature adjustment mode, and/or if the feature values (such as any feature value) of the second feature are not within the first range, it is determined that the feature adjustment mode is disabled for the current picture block.

Method 5: the encoding end encodes the feature adjustment flag and the second range in the bitstream, and the decoding end decodes the feature adjustment flag and the second range from the bitstream. If the feature adjustment flag allows the current picture block to enable the feature adjustment mode, and the feature change values (such as the feature change values corresponding to all feature values, that is, each feature value of the second feature corresponds to a feature change value) corresponding to the second feature is within the second range, the decoding end determines that the current picture block enables the feature adjustment mode. Otherwise, if the feature adjustment flag prohibits the current picture block from enabling the feature adjustment mode, and/or if the feature change values (such as any feature change values) corresponding to the second feature are not within the second range, it is determined that the feature adjustment mode is disabled for the current picture block.

Method 6: the encoding end encodes the first and second ranges in the bitstream, and the decoding end decodes the first and second ranges from the bitstream. If the feature values of the second feature are within the first range, and the feature change values corresponding to the second feature are within the second range, the decoding end can determine that the current picture block is enabled in feature adjustment mode. Otherwise, if the feature values of the second feature are not within the first range, and/or the feature change values corresponding to the second feature are not within the second range, the decoding end can determine that the feature adjustment mode is disabled for the current picture block.

Method 7: the encoding end encodes the feature adjustment flag, the first range, and the second range in the bitstream, and the decoding end decodes the feature adjustment flag, the first range, and the second range from the bitstream. If the feature adjustment flag allows the current picture block to enable the feature adjustment mode, and the feature values of the second feature are within the first range, and the feature change values corresponding to the second feature are within the second range, it is determined that the current picture block enables the feature adjustment mode. Otherwise, if the feature adjustment flag prohibits the current picture block from enabling the feature adjustment mode, the feature values of the second feature are not within the first range, and/or the feature change values corresponding to the second feature are not within the second range, then it is determined that the feature adjustment mode is disabled for the current picture block.

Method 8: if the attribute value corresponding to the second feature is within the configured attribute value range, the decoding end can determine that the feature adjustment mode is enabled for the current picture block. Otherwise, if the attribute value corresponding to the second feature is not within the configured attribute value range, the decoding end can determine that the feature adjustment mode is disabled for the current picture block. In method 8, the decoding end does not need to parse information related to the feature adjustment mode from the bitstream, but determines whether the current picture block is enabled for feature adjustment mode based on the configured attribute value range. In method 8, the attribute value corresponding to the second feature may include, but is not limited to, the variance value corresponding to the feature values in the second feature, where the variance value is used to indicate the degree of change at the location of a feature value of the second feature.

Embodiment 16: in Embodiment 14, for each feature value in the second feature, the feature value can be adjusted based on the feature adjustment value corresponding to the feature value, to obtain the adjusted feature value corresponding to the feature value. For the above feature adjustment process, it is necessary to first determine whether the conditions are met. If the conditions are met, the feature adjustment process can be carried out (that is, the feature adjustment value corresponding to the feature value can be used to adjust the feature value to obtain the adjusted feature value corresponding to the feature value).

For example, these conditions may include but are not limited to: 1. parsing relevant information based on an additional bitstream to determine whether to adjust the feature value, where the relevant information can be flag information indicating whether the region (which can be the feature, the channel of the feature, or a certain slice of the channel) where the current feature value is located needs to be adjusted, range information indicating the size of the feature value that needs to be adjusted (determining whether the current feature value is within this range to determine whether adjustment is necessary), or the range of changes in the spatial domain or channel domain of the feature value that needs to be adjusted (calculating the changes (such as gradient values) in the current feature value in the spatial domain or channel domain, and determining whether the changes are within this range, to determine whether adjustment is necessary).). 2. Based on a certain attribute of the feature value, such as the variance (representing the degree of change in the location of the feature value) corresponding to the current feature value.

For example, for each feature value in the second feature, to determine whether to adjust the feature value based on the feature adjustment value corresponding to the feature value to obtain the adjusted feature value corresponding to the feature value, the following method can be used.

Method 1: the encoding end encodes the feature adjustment flag corresponding to the feature value in the bitstream, and the decoding end decodes the feature adjustment flag corresponding to the feature value from the bitstream. The feature adjustment flag indicates whether to perform feature adjustment on the feature value or not. If the feature adjustment flag indicates to perform feature adjustment for the feature value, the decoding end adjusts the feature value based on the feature adjustment value corresponding to the feature value to obtain the adjusted feature value corresponding to the feature value. Otherwise, if the feature adjustment flag indicates not to perform feature adjustment on the feature value, the decoding end will not adjust the feature value based on the corresponding feature adjustment value. For example, if the feature adjustment flag is set to the first value, the feature adjustment flag is configured to indicate that feature adjustment is performed on the feature value. If the feature adjustment flag is set to the second value, the feature adjustment flag is configured to indicate that feature adjustment is not performed on the feature value.

Method 2: the encoding end encodes a first range of feature values in the bitstream, and the decoding end decodes the first range of feature values from the bitstream. Based on this, if the feature value is within the first range, the decoding end adjusts the feature value based on the corresponding feature adjustment value to obtain the adjusted feature value corresponding to the feature value. Otherwise, if the feature value is not within the first range, the decoding end will not adjust the feature value based on the corresponding feature adjustment value.

Method 3: the encoding end encodes the second range of feature change values in the bitstream, and the decoding end decodes the second range of feature change values from the bitstream. Based on this, if the feature change value (such as gradient value) corresponding to the feature value is within the second range, the decoding end adjusts the feature value based on the feature adjustment value corresponding to the feature value to obtain the adjusted feature value corresponding to the feature value. Otherwise, if the feature change value (such as gradient value) corresponding to the feature value is not within the second range, the decoding end will not adjust the feature value based on the feature adjustment value corresponding to the feature value.

Method 4: the encoding end encodes the feature adjustment flag and the first range in the bitstream, and the decoding end decodes the feature adjustment flag and the first range from the bitstream. If the feature adjustment flag indicates to perform feature adjustment on the feature value, and the feature value is within the first range, the decoding end adjusts the feature value based on the feature adjustment value corresponding to the feature value. Otherwise, the decoding end will not adjust the feature value based on the corresponding feature adjustment value.

Method 5: the encoding end encodes the feature adjustment flag and the second range in the bitstream, and the decoding end decodes the feature adjustment flag and the second range from the bitstream. If the feature adjustment flag indicates to perform feature adjustment on the feature value, and the feature change value corresponding to the feature value is within the second range, then the decoding end adjusts the feature value based on the feature adjustment value corresponding to the feature value. Otherwise, the feature value will not be adjusted based on the corresponding feature adjustment value.

Method 6: the encoding end encodes the first and second ranges in the bitstream, and the decoding end decodes the first and second ranges from the bitstream. If the feature value is within the first range and the feature change value corresponding to the feature value is within the second range, the decoding end adjusts the feature value based on the feature adjustment value corresponding to the feature value. Otherwise, the decoding end will not adjust the feature value based on the corresponding feature adjustment value.

Method 7: the encoding end encodes the feature adjustment flag, the first range, and the second range in the bitstream, and the decoding end decodes the feature adjustment flag, the first range, and the second range from the bitstream. If the feature adjustment flag indicates to perform feature adjustment on the feature value, and the feature value is within the first range, and the corresponding feature change value corresponding to the feature value is within the second range, the decoding end adjusts the feature value based on the feature adjustment value corresponding to the feature value. Otherwise, the decoding end will not adjust the feature value based on the corresponding feature adjustment value.

Method 8: if the attribute value corresponding to the feature value is within the configured attribute value range, the decoding end adjusts the feature value based on the feature adjustment value corresponding to the feature value. Otherwise, the decoding end will not adjust the feature value based on the corresponding feature adjustment value. In method 8, the decoding end does not need to parse information related to the feature adjustment mode from the bitstream, but determines whether the current picture block is enabled for feature adjustment mode based on the configured attribute value range. In method 8, the attribute value corresponding to the feature value may include, but is not limited to, the variance value corresponding to the feature values, where the variance value is used to indicate the degree of change at the location of a feature value.

Embodiment 17: referring to Embodiment 7, the encoding end can obtain the feature adjustment factor for the decoding subnetwork, and based on this feature adjustment factor, perform feature adjustment on a certain feature in the decoding subnetwork, and encode the feature adjustment factor for the decoding subnetwork in the auxiliary bitstream. The decoding end can decode the feature adjustment factor for the decoding subnetwork from the auxiliary bitstream, and perform feature adjustment on a certain feature in the decoding subnetwork based on this feature adjustment factor. For example, after obtaining feature A (which is any feature in the decoding subnetwork), the decoding subnetwork can use this feature adjustment factor to adjust feature A to obtain the adjusted feature B. The decoding subnetwork continues to process based on feature B, ultimately obtaining the first feature.

In an embodiment, as shown in FIG. 8A of Embodiment 8, the feature adjustment factor for the decoding subnetwork can be used for the feature recovery process in the decoding subnetwork. That is, in the feature recovery process, the feature adjustment factor is configured to adjust a certain feature. The feature adjustment process can be referred to in the feature adjustment process of the second feature, which will not be repeated here.

In an embodiment, as shown in FIG. 8B of Embodiment 9, the feature adjustment factor for the decoding subnetwork can be used for the residual recovery process in the decoding subnetwork. That is, in the residual recovery process, the feature adjustment factor is configured to adjust a certain feature. The feature adjustment process can be referred to in the feature adjustment process of the second feature, which will not be repeated here.

The above embodiments can be implemented separately or in combination. For example, each of embodiments 1-17 can be implemented separately, and at least two of embodiments 1-17 can be implemented in combination.

For example, in the above embodiments, the content of the encoding end can also be applied to the decoding end, that is, the decoding end can process in the same way, and the content of the decoding end can also be applied to the encoding end, that is, the encoding end can process in the same way.

Based on the same application concept as the above method, the embodiments of the present disclosure further provide a decoding device. The device is applied to the decoding end. The device includes: one or more memories configured to store video data; and a decoder configured to implement the decoding method in embodiments 1-17, namely the processing flow of the decoding end.

For example, in an embodiment, a decoder is configured to achieve:

obtaining a first feature corresponding to a current picture block by a first neural network, and obtaining a feature adjustment factor corresponding to the current picture block, where the first neural network includes at least one convolutional layer;

determining the target feature based on the first feature and the feature adjustment factor;

obtaining a reconstructed picture block corresponding to the current picture block by a second neural network based on the target feature, where the second neural network includes at least one convolutional layer.

Based on the same application concept as the above method, the embodiments of the present disclosure further provide an encoding device. The device is applied to the encoding end. The device includes: one or more memories configured to store video data; and an encoder configured to implement the encoding method in embodiments 1-17, namely the processing flow of the encoding end.

For example, in an embodiment, an encoder is configured to achieve:

obtaining the first feature corresponding to the current picture block by a first neural network, where the first neural network includes at least one convolutional layer; obtaining the feature adjustment factor corresponding to the current picture block based on the first feature; and encoding the feature adjustment factor in an auxiliary bitstream corresponding to the current picture block.

Figure 11A:
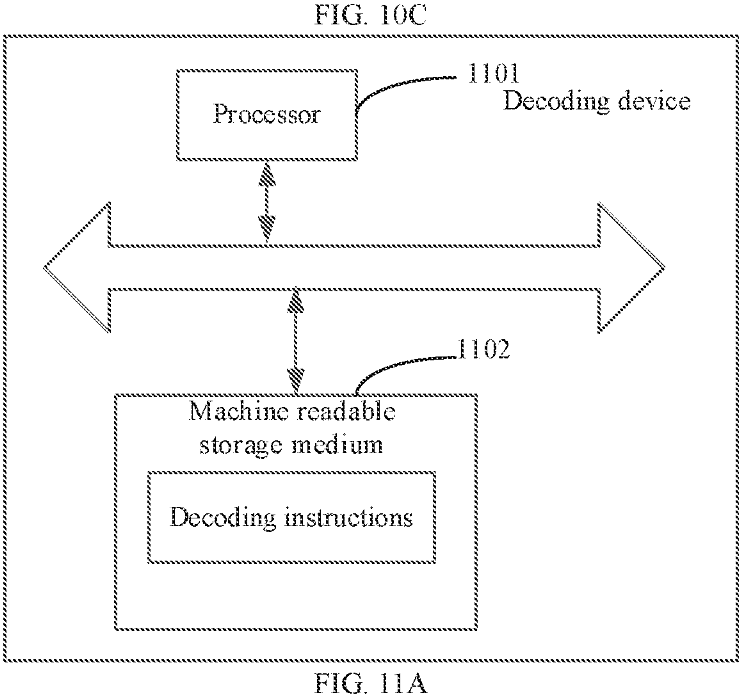
FIG. 11A is a hardware structure diagram of a decoding device according to an embodiment of the present disclosure.

Based on the same application concept as the above methods, a decoding device (also referred to as a video decoder) provided in the embodiments of the present disclosure has, from a hardware perspective, a hardware architecture, as shown in FIG. 11A. The hardware architecture includes processor 1101 and machine-readable storage medium 1102, where machine-readable storage medium 1102 stores machine executable instructions that can be executed by processor 1101. Processor 1101 is configured to execute machine executable instructions to implement the decoding methods of embodiments 1-17 in the present disclosure. For example, in an embodiment, the decoding device is configured to implement:

obtaining a first feature corresponding to a current picture block by a first neural network, and obtaining a feature adjustment factor corresponding to the current picture block, where the first neural network includes at least one convolutional layer;

determining the target feature based on the first feature and the feature adjustment factor;

obtaining a reconstructed picture block corresponding to the current picture block by a second neural network based on the target feature, where the second neural network includes at least one convolutional layer.

Figure 11B:
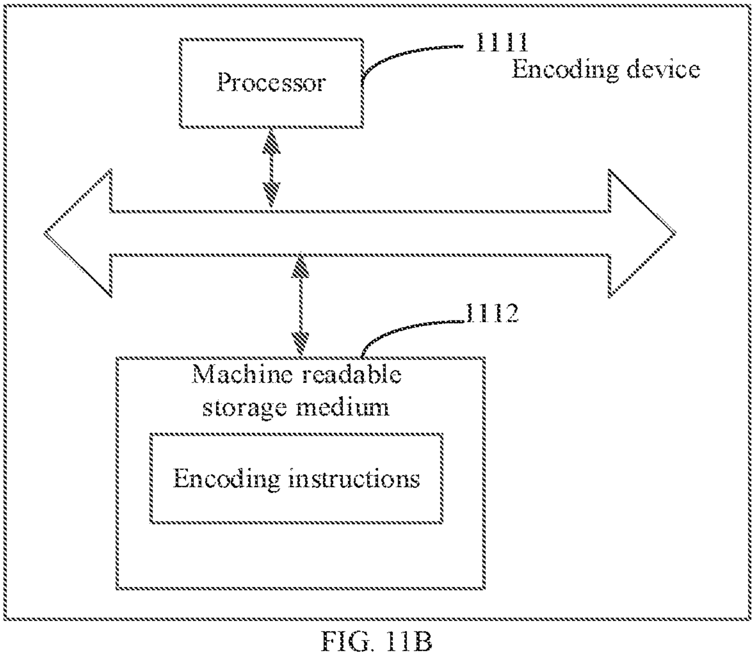
FIG. 11B is a hardware structure diagram of an encoding device according to an embodiment of the present disclosure.

Based on the same application concept as the above methods, the encoding device (also referred to as a video encoder) provided in the embodiments of the present disclosure, from a hardware perspective, can be specifically illustrated in FIG. 11B for schematic of its hardware architecture schematic. The hardware architecture schematic includes processor 1111 and machine-readable storage medium 1112, where machine-readable storage medium 1112 stores machine executable instructions that can be executed by processor 1111. The processor 1111 is configured to execute machine executable instructions to implement the encoding methods of embodiments 1-17 in the present disclosure. For example, in an embodiment, the encoding device is configured to implement:

obtaining the first feature corresponding to the current picture block by a first neural network, w % here the first neural network includes at least one convolutional layer; obtaining the feature adjustment factor corresponding to the current picture block based on the first feature; and encoding the feature adjustment factor in an auxiliary bitstream corresponding to the current picture block.

Based on the same application concept as the above methods, the embodiments of the present disclosure provide an electronic device. The electronic device includes processor and machine-readable storage medium, where machine-readable storage medium stores machine executable instructions that can be executed by processor; the processor is configured to execute machine executable instructions to implement the decoding method or encoding method of embodiments 1-17 in the present disclosure.

Based on the same application concept as the above methods, the embodiments of the present disclosure further provide a machine-readable storage medium, which stores several computer instructions. When the computer instructions are executed by a processor, the methods in the embodiments of the present disclosure can be implemented, such as the decoding methods or encoding methods in the above embodiments.

Based on the same application concept as the above methods, the embodiments of the present disclosure further provide a computer application program that, when executed by a processor, the decoding methods or encoding methods in the embodiments of the present disclosure are implemented.

Based on the same application concept as the above method, the embodiments of the present disclosure also propose a decoding apparatus, which can be applied to the decoding end. The decoding apparatus may include: an obtaining module for obtaining the first feature corresponding to the current picture block through a first neural network, and obtaining the feature adjustment factor corresponding to the current picture block, where the first neural network includes at least one convolutional layer; a determining module for determining a target feature based on the first feature and the feature adjustment factor; where the obtaining module is further used to obtain the reconstructed picture block corresponding to the current picture block through a second neural network based on the target feature, where the second neural network includes at least one convolutional layer.

For example, when obtaining the first feature corresponding to the current picture block by the first neural network, the obtaining module is configured for; obtaining one or a probability distribution parameter based on the first bitstream corresponding to the current picture block; determining a probability distribution model based on the probability distribution parameter, and one or decoding a second bitstream corresponding to the current picture block based on the probability distribution model to obtain a decoded picture feature; and determining the first feature corresponding to the current picture block based on the decoded picture feature.

For example, when obtaining the first feature corresponding to the current picture block by the first neural network, the obtaining module is configured for: obtaining a probability distribution parameter and a predicted value based on the first bitstream corresponding to the current picture block; determining the probability distribution model based on probability distribution parameter, and decoding the second bitstream corresponding to the current picture block based on the probability distribution model to obtain the decoded picture feature; performing residual recovery on the decoded picture feature to obtain a residual feature; and determining the first feature corresponding to the current picture block based on the residual feature and the predicted value.

For example, when obtaining the feature adjustment factor corresponding to the current picture block, the obtaining module is configured for: decoding an auxiliary bitstream corresponding to the current picture block to obtain the feature adjustment factor corresponding to the current picture block; or determining a fixed parameter value as the feature adjustment factor corresponding to the current picture block.

For example, when determining the target feature based on the first feature and the feature adjustment factor, the determining module is configured for: performing feature enhancement on the first feature to obtain the second feature; based on the feature adjustment factor, performing feature adjustment on the second feature to obtain a third feature; determining the target feature based on the third feature.

For example, when performing feature enhancement on the first feature to obtain the second feature, the determining module is configured for: determining the initial feature corresponding to the attention subnetwork based on the first feature; enhancing the initial feature through the attention subnetwork to obtain the second feature; for example, the determining module is specifically used to determine the third feature as the target feature when determining the target feature based on the third feature.

The attention subnetwork may include a residual enhancement subnetwork and a weight generation subnetwork. When performing the feature enhancement on the initial feature by the attention subnetwork to obtain the second feature, the determining module is configured for: performing feature enhancement on the initial feature by the residual enhancement subnetwork, to obtain an enhanced feature; generating a weight feature corresponding to the initial feature by the weight generation subnetwork; and generating the second feature based on the enhanced feature and the weight feature.

For example, the weight generation subnetwork includes a residual block subnetwork, a convolutional subnetwork, and a feature mapping subnetwork, and when generating the weight feature corresponding to the initial feature by the weight generation subnetwork, the determining module is configured for: convoluting and activating the initial feature by the residual block subnetwork, to obtain a convoluted activated feature; convoluting the convoluted activated feature by the convolutional subnetwork, to obtain a convoluted feature; performing feature mapping on the convoluted feature by the feature mapping subnetwork to obtain the weight feature.

For example, the determining module, when performing feature enhancement on the first feature to obtain the second feature, is specifically configured for: determining the initial feature corresponding to the attention subnetwork based on the first feature; by the first subnetwork of the attention subnetwork, performing feature enhancement on the initial feature, to obtain the second feature. When determining the target feature based on the third feature, the determining module is specifically configured for: processing the third feature by the second subnetwork of the attention subnetwork, to obtain the fourth feature, and determining the fourth feature as the target feature.

For example, the determining module, when enhancing the initial feature through the first subnetwork of the attention subnetwork, to obtain the second feature, is configured for: by a residual enhancement subnetwork, performing feature enhancement on the initial feature to obtain the enhanced feature; by a weight generation subnetwork, generating weight feature corresponding to the initial feature; and generating a second feature based on enhanced feature and weight feature. The determining module, when processing the third feature by the second subnetwork of the attention subnetwork to obtain the fourth feature, is specifically configured to generate the fourth feature based on the initial feature and the third feature.

For example, the determining module, when enhancing the initial feature by the first sub network in the attention sub network, to obtain the second feature, is configured for: by the residual block subnetwork, enhancing the initial feature to obtain the enhanced feature; by a convolutional subnetwork, convoluting the enhanced feature to obtain the convolved feature, and determining the second feature based on the convolved feature. The determining module, when processing the third feature through the second sub network in the attention sub network to obtain the fourth feature, is specifically configured for: by the feature mapping subnetwork, performing feature mapping on the third feature to obtain a weight feature; by the residual enhancement network, enhancing the initial feature to obtain enhanced feature; and generating the fourth feature based on the initial feature, enhanced feature, and weight feature.

For example, the determining module, when determining the initial feature corresponding to the attention subnetwork based on the first feature, is specifically configured for: performing feature enhancement on the first feature by an initial enhancement subnetwork, to obtain an enhanced feature; and performing upsampling convolution on the enhanced feature by an upsampling convolutional subnetwork, to obtain the initial feature.

For example, when performing the feature adjustment on the second feature based on the feature adjustment factor, to obtain the third feature, the determining module is configured for: when the second feature includes C*H*W feature values, where the C represents a number of channels, the H represents a feature height, and the W represents a feature width, determining feature adjustment value corresponding to each feature value based on the feature adjustment factor, and performing feature adjustment on the feature value based on the corresponding feature adjustment value to obtain adjusted feature value corresponding to the feature value; and generating the third feature based on the adjusted feature value corresponding to each feature value.

For example, when determining the feature adjustment values corresponding to the C*H*W feature values based on the feature adjustment factor, the determining module is configured for: when the feature adjustment factor includes C*H*W feature adjustment values, determining feature adjustment values respectively corresponding to the C*H*W feature values based on the C*H*W feature adjustment values; or when the feature adjustment factor includes H*W feature adjustment values, determining feature adjustment values respectively corresponding to the C*H*W feature values based on the H*W feature adjustment values; or when the feature adjustment factor includes C feature adjustment values, determining feature adjustment values respectively corresponding to the C*H*W feature values based on the C feature adjustment values.

For example, the determining module, when performing feature adjustment on the feature value based on the feature adjustment value corresponding to the feature value to obtain the adjusted feature value corresponding to the feature value, is configured for: if the feature value corresponds to only one feature adjustment value, determining the adjusted feature value using the following formula: yr=rf*y; where yr represents the adjusted feature value, rf represents the feature adjustment value, and y represents the feature value. Alternatively, if the feature values correspond to N+1 feature adjustment values and N is a positive integer, the adjusted feature values can be determined using the following formula: $yr=rf\_0*y^0+rf\_1*y^1+rf\_2*y^2+ \ldots +rf\_N*y^N$; where yr represents the adjusted feature value, rf_0, rf_1, rf 2, . . . , rf_n represent N+1 feature adjustment values, and y represents the feature value.

For example, the second neural network includes a reconstruction decoding subnetwork, and when obtaining the reconstructed picture block corresponding to the current picture block by the second neural network based on the target feature, the obtaining module is configured for: processing the target feature through the reconstruction decoding subnetwork to obtain the reconstructed picture block;

where the reconstruction decoding subnetwork includes an upsampling convolutional subnetwork, performing upsampling convolution on the target feature by the upsampling convolutional subnetwork to obtain the reconstructed picture block; or where the reconstruction decoding subnetwork includes an upsampling convolutional subnetwork and a color space transformation subnetwork, performing upsampling convolution on the target feature by the upsampling convolutional subnetwork, and performing color space transformation on a upsampled convoluted feature by the color space transformation subnetwork to obtain the reconstructed picture block.

Based on the same application concept as the above method, the embodiments of the present disclosure also propose an encoding apparatus, which is applied to the encoding end. The apparatus includes: an obtaining module for obtaining the first feature corresponding to the current picture block through a first neural network, where the first neural network includes at least one convolutional layer; and obtaining the feature adjustment factor corresponding to the current picture block based on the first feature; and an encoding module for encoding the feature adjustment factor in the auxiliary bitstream corresponding to the current picture block.

For example, when obtaining the feature adjustment factor corresponding to the current picture block based on the first feature, the obtaining module is specifically configured to: obtain at least one candidate feature adjustment factor; determine the rate distortion cost corresponding to each candidate feature adjustment factor based on the first feature; based on the rate distortion cost corresponding to each candidate feature adjustment factor, select one candidate feature adjustment factor from all candidate feature adjustment factors as the feature adjustment factor corresponding to the current picture block.

It should be understood by those skilled in the art that embodiments of the present disclosure can be provided as methods, systems, or computer program products. The present disclosure can take the form of an entirely hardware embodiment, an entirely software embodiment, or an embodiment combining software and hardware aspects. The present disclosure can employ the form of a computer program product implemented on one or more computer-usable storage media (including, but not limited to, disk storage, CD-ROM, optical storage, etc.), where the one or more computer-usable storage media having computer-usable program code. The above description is only embodiments of the present disclosure and is not intended to limit the present disclosure.

For those skilled in the art, various modifications and changes can be made in the present disclosure. Any modification, equivalent replacement, improvement, etc. present the spirit and principle of the present disclosure shall be included in the scope of the claims of the present disclosure.

The invention claimed is:

1. A method for image decoding, comprising:

obtaining a first feature corresponding to a current picture block by a first neural network, and obtaining a feature adjustment factor corresponding to the current picture block;

performing feature enhancement on the first feature to obtain a second feature;

performing feature adjustment on the second feature based on the feature adjustment factor, to obtain a third feature;

determining a target feature based on the third feature; and obtaining a reconstructed picture block corresponding to the current picture block by a second neural network based on the target feature.

2. The method according to claim 1, wherein performing feature enhancement on the first feature to obtain the second feature comprises:

determining an initial feature corresponding to an attention subnetwork based on the first feature;

performing feature enhancement on the initial feature by a residual enhancement subnetwork, to obtain an enhanced feature;

generating a weight feature corresponding to the initial feature by a weight generation subnetwork; and generating the second feature based on the enhanced feature and the weight feature.

3. The method according to claim 2, wherein determining the initial feature corresponding to the attention subnetwork based on the first feature comprises:

performing feature enhancement on the first feature by an initial enhancement subnetwork, to obtain an enhanced feature; and performing upsampling convolution on the enhanced feature by an upsampling convolutional subnetwork, to obtain the initial feature corresponding to the attention subnetwork.

4. The method according to claim 2, wherein the weight generation subnetwork comprises a residual block subnetwork, a convolutional subnetwork, and a feature mapping subnetwork, and generating the weight feature corresponding to the initial feature by the weight generation subnetwork comprises:

convoluting and activating the initial feature by the residual block subnetwork, to obtain a convoluted activated feature;

convoluting the convoluted activated feature by the convolutional subnetwork, to obtain a convoluted feature; and performing feature mapping on the convoluted feature by the feature mapping subnetwork to obtain the weight feature.

5. The method according to claim 1, wherein performing the feature adjustment on the second feature based on the feature adjustment factor, to obtain the third feature comprises:

when the second feature comprises C*H*W feature values, wherein the C represents a number of channels, the H represents a feature height, and the W represents a feature width, determining feature adjustment values corresponding to the C*H*W feature values based on the feature adjustment factor, and performing feature adjustment on the C*H*W feature values based on the feature adjustment values to obtain adjusted feature values corresponding to the C*H*W feature values, and generating the third feature based on the adjusted feature values corresponding to the C*H*W feature values.

6. The method according to claim 1, further comprising:

when a feature adjustment mode is enabled for the current picture block, obtaining the feature adjustment factor corresponding to the current picture block, wherein determining whether the current picture block enables the feature adjustment mode includes:

parsing a feature adjustment flag from a bitstream, and when the feature adjustment flag allows the current picture block to enable a feature adjustment mode, determining that the current picture block enables the feature adjustment mode; or parsing a first range of feature values from the bitstream, and when feature values of the second feature are within the first range, determining that the current picture block enables a feature adjustment mode.

7. The method according to claim 1, wherein the first neural network comprises a decoding subnetwork, and obtaining the first feature corresponding to the current picture block by the first neural network comprises:

obtaining a probability distribution parameter based on a bitstream corresponding to the current picture block; determining a probability distribution model based on the probability distribution parameter, and decoding a bitstream corresponding to the current picture block based on the probability distribution model to obtain a decoded picture feature; and determining the first feature corresponding to the current picture block based on the decoded picture feature; or obtaining a probability distribution parameter and a predicted value based on a bitstream corresponding to the current picture block; and determining a probability distribution model based on the probability distribution parameter, and decoding a bitstream corresponding to the current picture block based on the probability distribution model to obtain a decoded picture feature; and performing residual recovery on the decoded picture feature to obtain a residual feature; and determining the first feature corresponding to the current picture block based on the residual feature and the predicted value.

8. The method according to claim 1, wherein obtaining the feature adjustment factor corresponding to the current picture block comprises:

decoding a bitstream corresponding to the current picture block to obtain the feature adjustment factor corresponding to the current picture block; or determining a fixed parameter value as the feature adjustment factor corresponding to the current picture block.

9. The method according to claim 1, wherein the second neural network comprises a reconstruction decoding subnetwork, and obtaining the reconstructed picture block corresponding to the current picture block by the second neural network based on the target feature comprises:

processing the target feature by reconstruction decoding subnetwork, to obtain the reconstructed picture block;

wherein the reconstruction decoding subnetwork comprises an upsampling convolutional subnetwork, performing upsampling convolution on the target feature by the upsampling convolutional subnetwork to obtain the reconstructed picture block; or wherein the reconstruction decoding subnetwork comprises an upsampling convolutional subnetwork and a color space transformation subnetwork, performing upsampling convolution on the target feature by the upsampling convolutional subnetwork to obtain an upsampled convoluted feature, and performing color space transformation on the upsampled convoluted feature by the color space transformation subnetwork to obtain the reconstructed picture block.

10. A method for image encoding, comprising:

obtaining a first feature corresponding to the current picture block by a first neural network;

obtaining a feature adjustment factor corresponding to the current picture block based on the first feature;

encoding the feature adjustment factor in a bitstream corresponding to the current picture block;

performing feature enhancement on the first feature to obtain a second feature;

performing feature adjustment on the second feature based on the feature adjustment factor, to obtain a third feature;

determining a target feature based on the third feature; and obtaining a reconstructed picture block corresponding to the current picture block by a second neural network based on the target feature.

11. A decoding device, comprising:

one or more memories configured to store video data; and a decoder configured to implement:

obtaining a first feature corresponding to a current picture block by a first neural network, and obtaining a feature adjustment factor corresponding to the current picture block;

performing feature enhancement on the first feature to obtain a second feature;

performing feature adjustment on the second feature based on the feature adjustment factor, to obtain a third feature;

determining a target feature based on the third feature; and obtaining a reconstructed picture block corresponding to the current picture block by a second neural network based on the target feature.

12. An encoding device, comprising:

one or more memories configured to store video data; and an encoder configured to implement:

obtaining a first feature corresponding to the current picture block by a first neural network;

obtaining a feature adjustment factor corresponding to the current picture block based on the first feature;

encoding the feature adjustment factor in a bitstream corresponding to the current picture block;

performing feature enhancement on the first feature to obtain a second feature;

performing feature adjustment on the second feature based on the feature adjustment factor, to obtain a third feature;

determining a target feature based on the third feature; and obtaining a reconstructed picture block corresponding to the current picture block by a second neural network based on the target feature.

13. A decoding device, comprising: one or more processors and one or more machine-readable storage media, wherein the one or more machine-readable storage media store machine executable instructions that can be executed by the one or more processors; and the one or more processors are configured to execute the machine executable instructions to implement the method according to claim 1.

14. An encoding end device, comprising: one or more processors and one or more machine-readable storage media, wherein the one or more machine-readable storage media store machine executable instructions that can be executed by the one or more processors; and the one or more processors are configured to execute the machine executable instructions to implement the method according to claim 10.

15. A electronic device, comprising: one or more processors and one or more machine-readable storage media, wherein the one or more machine-readable storage media store machine executable instructions that can be executed by the one or more processors, and the one or more processors are configured to execute the machine executable instructions to implement the method according to claim 1.

16. A non-transitory machine readable storage medium, wherein the machine readable storage medium stores computer instructions, and one or more processors execute the computer instructions to implement the method according to claim 1.

17. The method according to claim 1, wherein determining the target feature based on the third feature comprises:

determining an initial feature corresponding to an attention subnetwork based on the first feature; generating a fourth feature based on the initial feature and the third feature; and determining the target feature based on the fourth feature.

18. The method according to claim 5, wherein determining the feature adjustment values corresponding to the C*H*W feature values based on the feature adjustment factor comprises:

when the the feature adjustment factor includes C*H*W feature adjustment values, determining the feature adjustment values respectively corresponding to the C*H*W feature values based on the C*H*W feature adjustment values; or when the the feature adjustment factor includes H*W feature adjustment values, determining the feature adjustment values respectively corresponding to the C*H*W feature values based on the H*W feature adjustment values; or when the the feature adjustment factor includes C feature adjustment values, determining the feature adjustment values respectively corresponding to the C*H*W feature values based on the C feature adjustment values.

19. The method according to claim 7, wherein obtaining the first feature corresponding to the current picture block by the first neural network comprises:

obtaining the probability distribution parameter based on a bitstream corresponding to the current picture block; determining the probability distribution model based on the probability distribution parameter, and decoding a bitstream corresponding to the current picture block based on the probability distribution model to obtain the decoded picture feature; and determining the first feature corresponding to the current picture block based on the decoded picture feature; and the method further comprises: performing synthesis transformation on the first feature by a synthetic transformation network to obtain a reconstructed picture block corresponding to the current picture block; wherein during the synthesis transformation, the first feature is enhanced to obtain the second feature; the feature adjustment is performed on the second feature based on the feature adjustment factor, to obtain the third feature; the target feature is determined based on the third feature; and the reconstructed picture block corresponding to the current picture block is determined based on the target feature.

20. The method according to claim 19, wherein the method further comprises: obtaining a predicted value based on a bitstream corresponding to the current picture block; and determining the first feature corresponding to the current picture block based on the decoded picture feature comprises: performing residual recovery on the decoded picture feature to obtain a residual feature; and determining the first feature corresponding to the current picture block based on the residual feature and the predicted value.

* * * * *